United States Patent
Bricaud et al.

(10) Patent No.: US 6,802,448 B2
(45) Date of Patent: Oct. 12, 2004

(54) COMPACT SMART CARD READER WITH EJECTOR

(75) Inventors: Hervé Guy Bricaud, Dole (FR); Yves Pizard, Dole (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 271 days.

(21) Appl. No.: 09/988,128

(22) Filed: Nov. 15, 2001

(65) Prior Publication Data

US 2002/0088857 A1 Jul. 11, 2002

Related U.S. Application Data

(63) Continuation-in-part of application No. PCT/EP00/04253, filed on May 11, 2000.

(30) Foreign Application Priority Data

May 17, 1999 (FR) .............................................. 99 06196

(51) Int. Cl.[7] .............................. G06K 7/06; G06K 7/08; G06K 7/00
(52) U.S. Cl. ......................... 235/451; 235/441; 235/486
(58) Field of Search ................................. 235/435, 439, 235/441, 451, 486

(56) References Cited

U.S. PATENT DOCUMENTS 5,473,505 A * 12/1995 Kessoku et al. ............ 361/684
5,573,413 A * 11/1996 David et al. ................. 439/159
6,042,403 A * 3/2000 Nishioka ..................... 439/159
6,071,136 A 6/2000 Bricaud et al.
6,138,916 A * 10/2000 Zolkos et al. ............... 235/475
6,508,402 B1 * 1/2003 Takada et al. .............. 235/451

FOREIGN PATENT DOCUMENTS

| DE | 19545502 C1 | 6/1997 |
| EP | 0749088 A1 | 12/1996 |
| EP | 0903690 A2 | 3/1999 |
| WO | WO9602893 A1 | 2/1996 |

* cited by examiner

Primary Examiner—Thien M. Le
Assistant Examiner—April A. Nowlin
(74) Attorney, Agent, or Firm—Roger C. Turner

(57) ABSTRACT

A smart card reader includes a frame (102), a carriage (108) that can slide forwardly when pushed forwardly by the front end of an inserted smart card, and a double click mechanism (193) that latches the carriage in a forward position when pushed there by a card, until the card is pushed forward a second time, a spring then pushing the carriage rearwardly to partially reject the card. A cam follower (112) of the double click mechanism has a pivoted mount end (214) that is held with friction against free pivoting by the spring. The frame includes a rear body (104) with a pair of legs (118, 119) projecting forwardly from opposite sides and straddling the carriage and forming fixed stops (191, 193) on opposite sides of the carriage. The frame also includes a front body (106) attached to front ends of the legs and forming a middle cavity region that receives the carriage, spring, and cam follower.

22 Claims, 25 Drawing Sheets

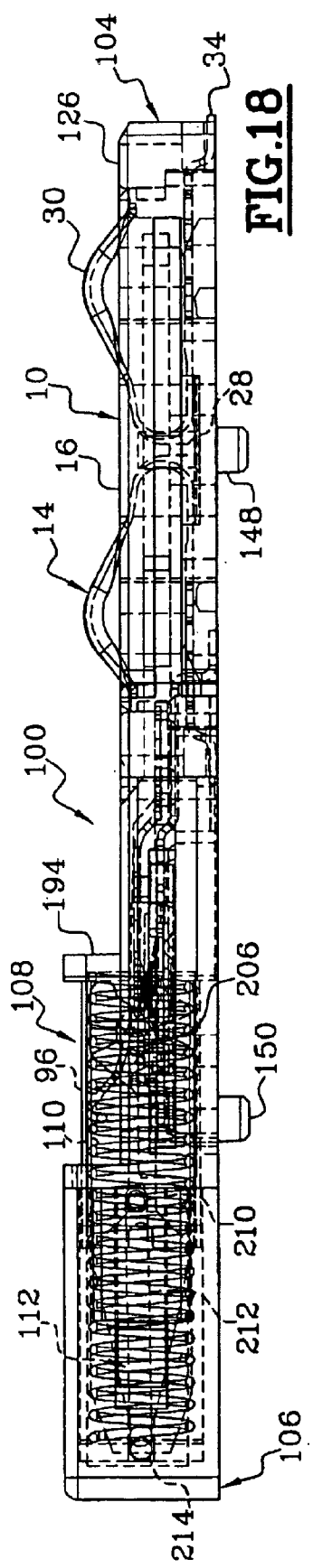
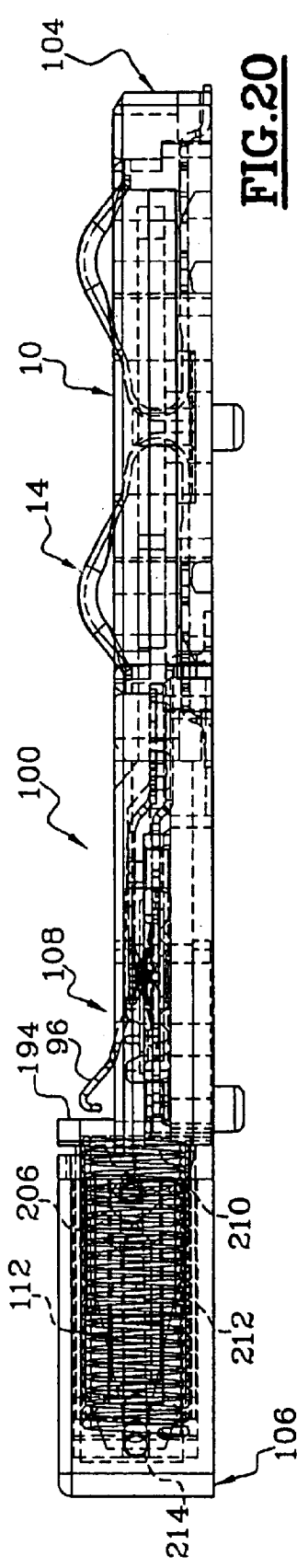
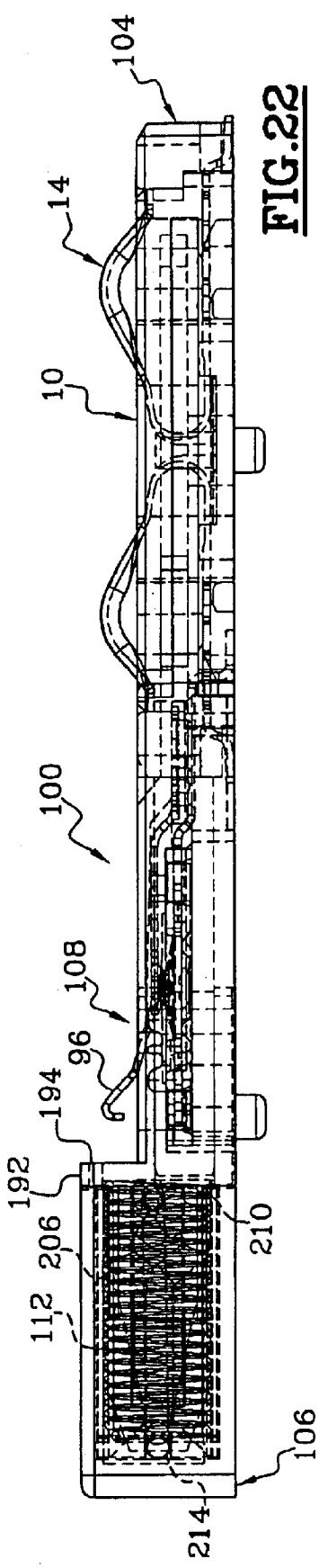

COMPACT SMART CARD READER WITH EJECTOR

CROSS-REFERENCE TO RELATED APPLICATION

This is a continuation-in-part of PCT application PCT/EP00/04253 filed May 11, 2000 which claims priority from French application 9906196 filed May 17, 1999.

BACKGROUND OF THE INVENTION

Smart cards have a thickness of no more than about 1 mm and an embedded chip connected to conductive pads on one of its faces. Data is read into and out of the chip by a reader with contacts that engage the pads. The card is commonly inserted forwardly into a slot of a card reader. If perhaps ten millimeters at the rear of the card projects from the card reader then this facilitates pullout of a card. However, such long projecting portion is undesirable, as a person moving across the projecting card portion may be hurt and/or the card may be damaged. It is desirable that the card reader enable the card to be almost fully inserted and later be ejected by a several (at least five) millimeters for pullout, in a compact reader such as one that can fit in a cell phone, and with tactile feedback assuring a person of full insertion.

SUMMARY OF THE INVENTION

In accordance with one embodiment of the present invention, a compact smart card reader is provided, which enables substantially full insertion of a card and later rearward pushout of the card by a plurality of millimeters so the card be grasped and fully pulled out, in a compact and simple reader construction. The reader has a frame with a rear body, the body having a pair of legs projecting forwardly from opposite sides of a rear part of the rear body. The frame also includes a front body with a rearwardly-opening cavity whose opposite sides receive and are fixed to each of the legs. The front body has a middle cavity that opens rearwardly. A carriage is slidably guided in forward and rearward movement between the legs. At least one spring biases the carriage forwardly, and at least a portion of the spring and of the carriage lies in the middle cavity portion of the front body.

The reader has a double click mechanism that latches the carriage in its forward position the first time the card is pushed forward to an overtravel position. The second time that the card is pushed forward, the mechanism releases the card to be moved rearwardly by the spring. The legs form a pair of stops that define the overtravel position. The double click mechanism includes a cam formed by a heart-shaped recess in the carriage, and a cam follower that engages the cam and that is pivotally mounted on the frame. A helical spring that pushes the carriage forwardly, presses against a pivoting part of the cam follower to provide friction against free pivoting, so as to assure better operation of the double click mechanism.

The novel features of the invention are set forth with particularity in the appended claims. The invention will be best understood from the following description when read in conjunction with the accompanying drawings.

BRIEF DESCRIPTION OF THE DRAWINGS

FIG. 18 is a side elevation view of the reader of FIG. 17.

FIG. 20 is a side elevation view of the carriage of FIG. 19.

FIG. 22 is a side elevation view of the carriage of FIG. 21.

DESCRIPTION OF THE PREFERRED EMBODIMENTS

Figure 1:
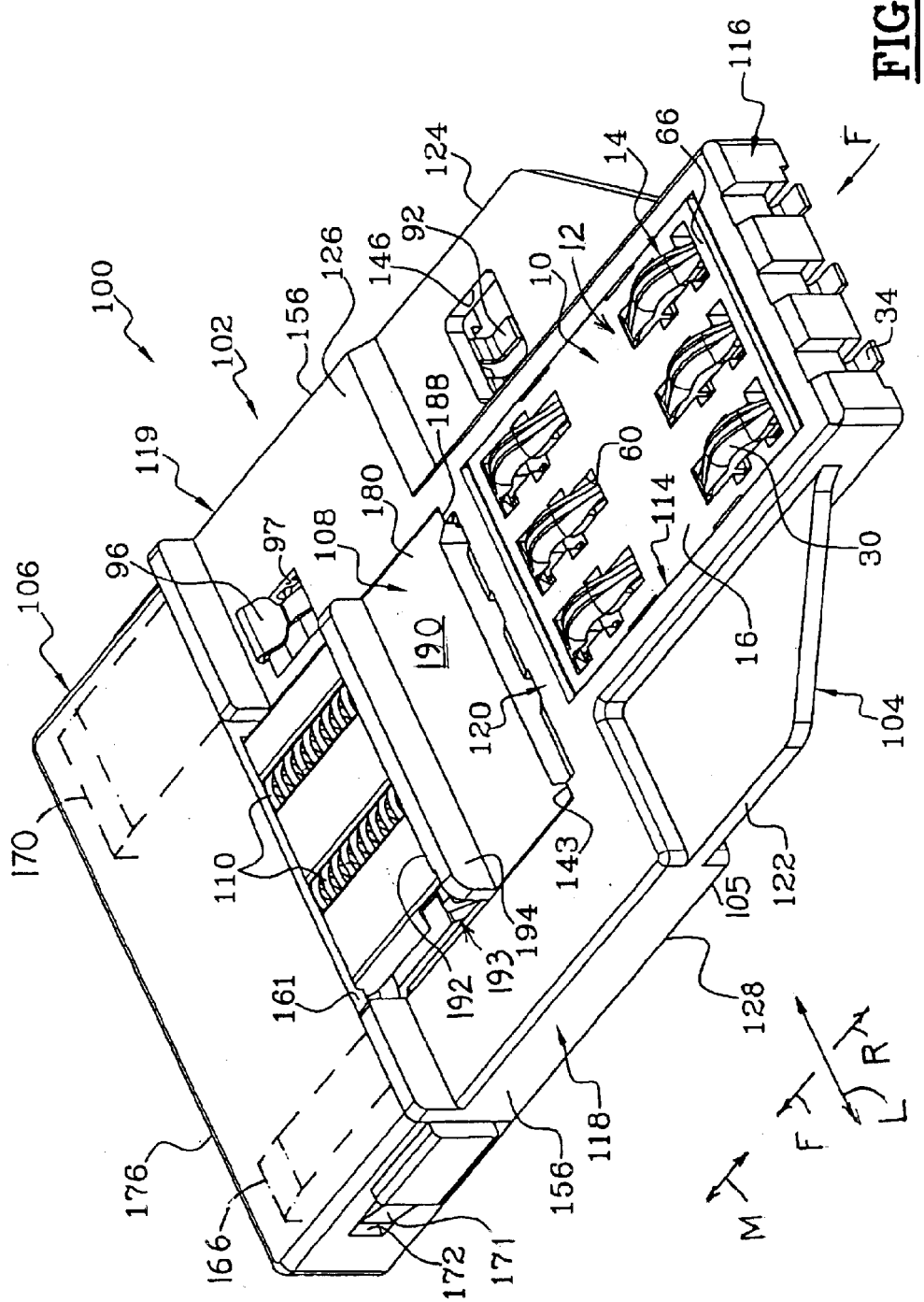
FIG. 1 is a top and rear isometric view of a card reader constructed in accordance with the present invention, with the carriage in its rear, or initial position.
Figure 2:
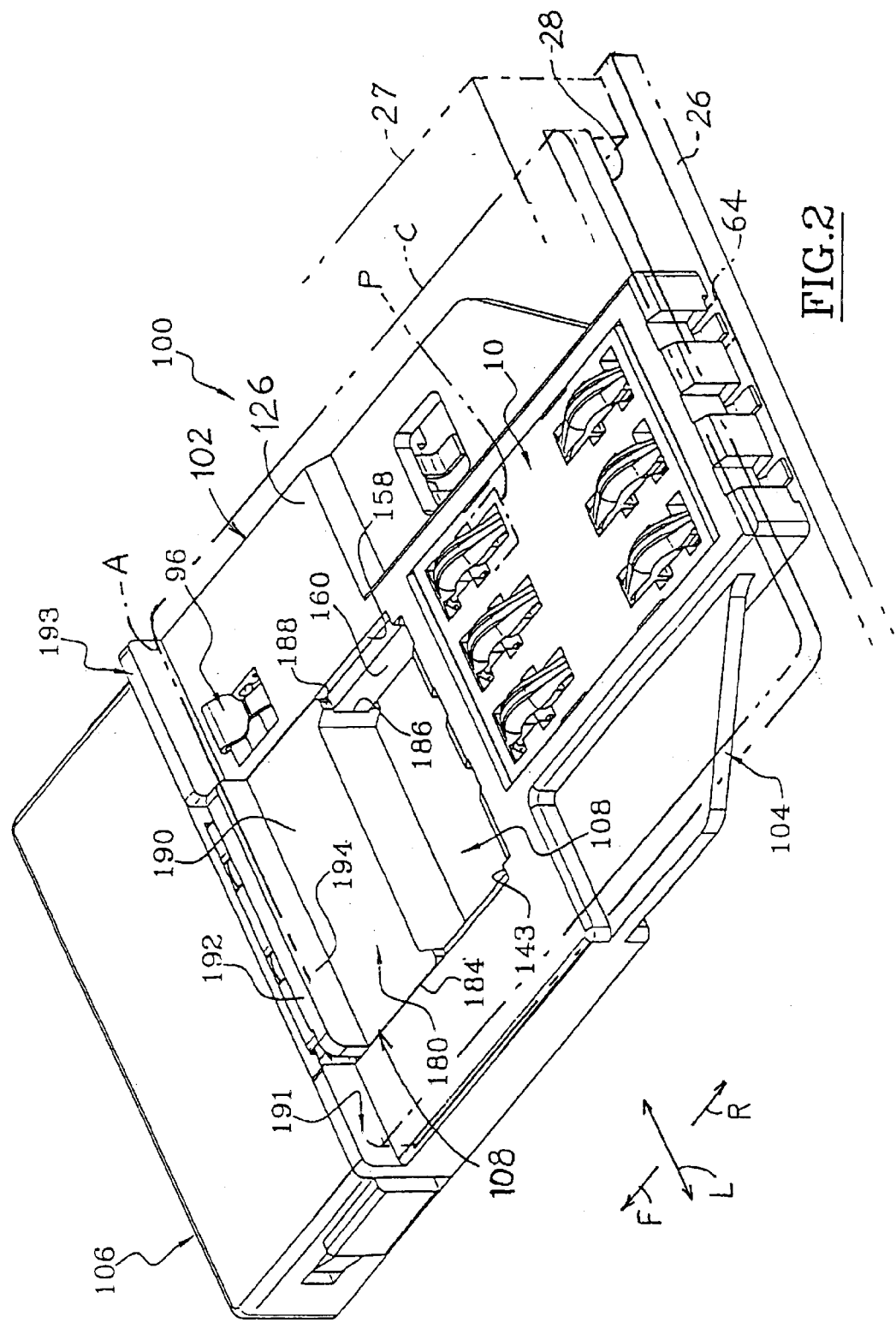
FIG. 2 is a view similar to FIG. 1, with the carriage in its front rest position, and also showing in phantom lines, a card inserted in the reader, a circuit board, and a cover.

FIG. 2 shows a smart card reader 100 which includes a frame 102 and a carriage 108 mounted for sliding in forward F and rearward R directions on the frame. The figure shows a smart card C with contact pads P on its lower surfaces, which has been inserted fully into the frame. A front end A of the card lies against a pushing surface 194 on a stop wall 192 of the carriage. The frame 102 is mounted on a circuit board 26. A cover 27 holds down the lower face 28 of the card close to a card adjacent face 126 of the frame. FIG. 1 shows the initial or rearward position of the carriage 108 wherein the push surface 194 is at least five millimeters rearward of the rear position of FIG. 2, and usually about 1cm rearward of the position of FIG. 2.

The frame includes an insulator part 12 that holds a plurality of contacts 14 that engage the pads on the smart card. The insulator part 12 of FIG. 1 is molded separately, with the contacts 14 inserted into place therein. The insulator part 12 can be molded integrally with a surrounding portion of the frame, and with the contacts molded into that frame portion.

The frame 102 includes a main or rear body 104 and a front body 106. The rear body 104 includes a rear portion 105 and a pair of legs 118, 119 that extend forwardly from laterally L opposite sides of the rear portion. The carriage 108 lies between the legs 118, 119 and is guided in forward and rearward longitudinal M directions by the legs. The legs have front ends 166, 170 that are received in the front body to fix the front and rear bodies together. Lugs 171 on the legs lock into slots 172 at the sides of the rear body.

A pair of helical wire compression springs 110 bias the carriage 108 rearward, but allow the carriage to move forwardly when pressed forwardly by an inserted card. A double click device 193 latches the carriage in its forward position shown in FIG. 2 when the carriage has been moved forwardly by a card. A pedal actuator 96 of a switch detects when the card has been fully inserted, the card depressing the pedal 96 to close the switch.

Figure 14:
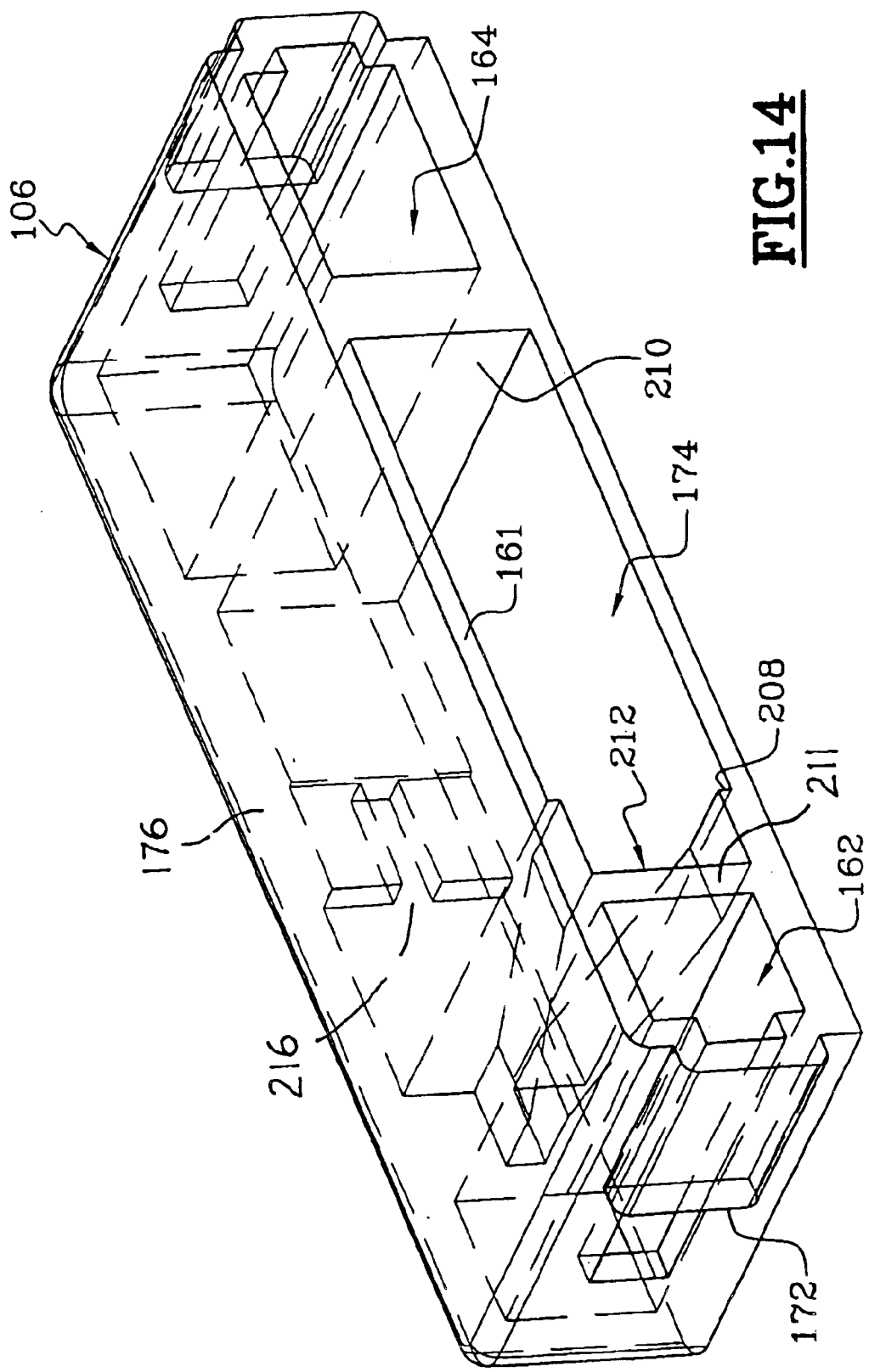
FIG. 14 is a rear and top isometric view of the front body of the reader of FIG. 1.
Figure 15:
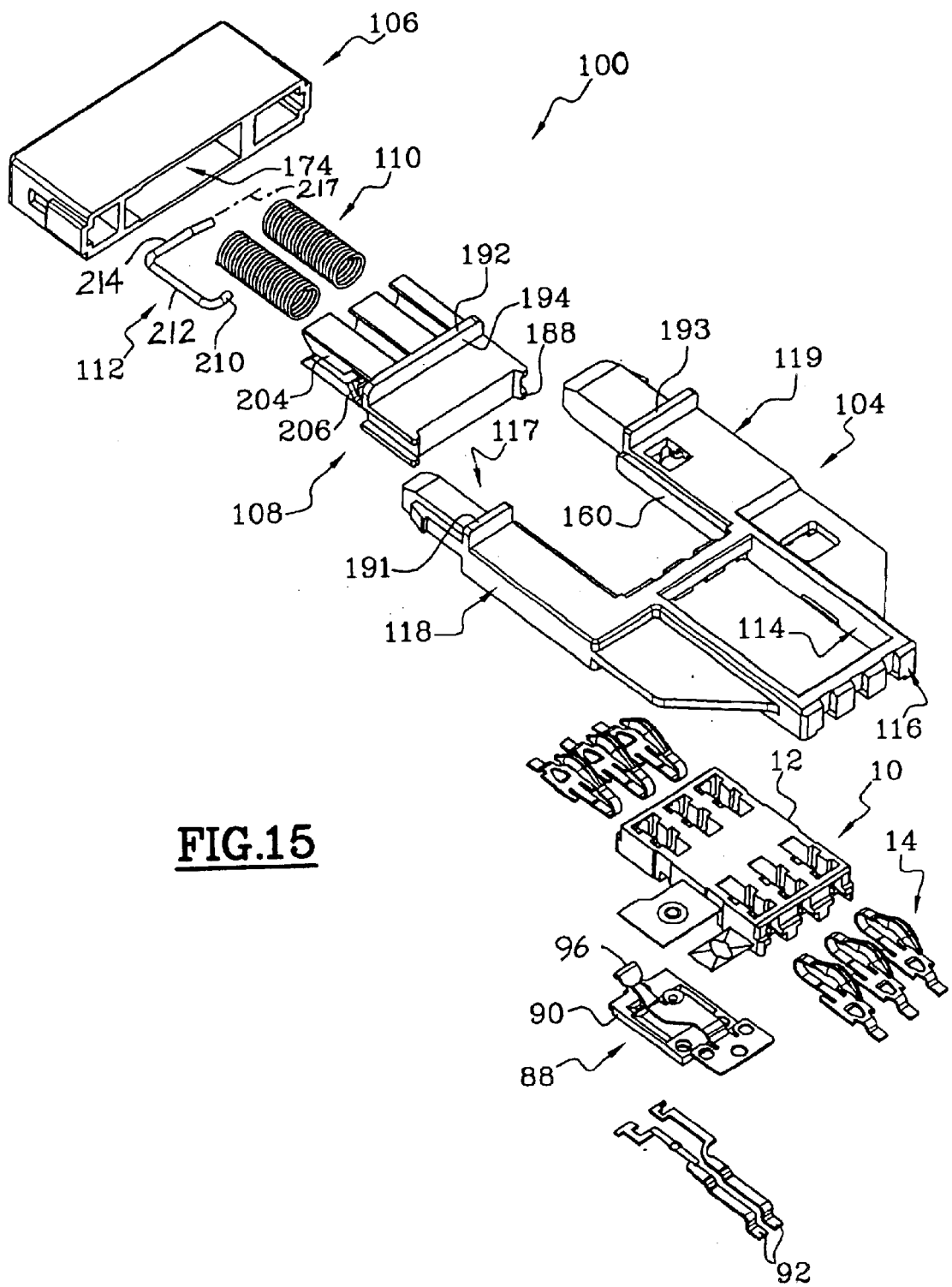
FIG. 15 is an exploded top and rear isometric view showing all of the components of the reader of FIG. 1.

FIG. 14 shows that the front body 106 includes a pair of side cavity parts 162, 164 that receive the front ends of the legs. The front body also has a center cavity portion 174 that receives much of the carriage and the two springs, and that also receives a cam follower of the double click mechanism. FIG. 15 shows the components of the smart card reader 100, which includes the front body 106, the two springs 110, the carriage 108, the rear body 104 with its legs 118, 119. The insulator part 12 is part of a connector 10 that receives six contacts 14. The underside of the rear body holds a switch 88 which includes the pedal 96 mounted on a switch body 90. Switch terminals 92 connect the switch to traces on the circuit board. The double click mechanism includes a cam follower 112 that engages a cam 206 formed by a recess on the carriage. The cam follower 112 includes a first end 210 that extends laterally and that fits into the recess that forms the cam, a second part 212, and a third part 214. The third part 214 can pivot about a laterally-extending axis 217 to allow the first part to move up and down in the cam 206.

Figure 12:
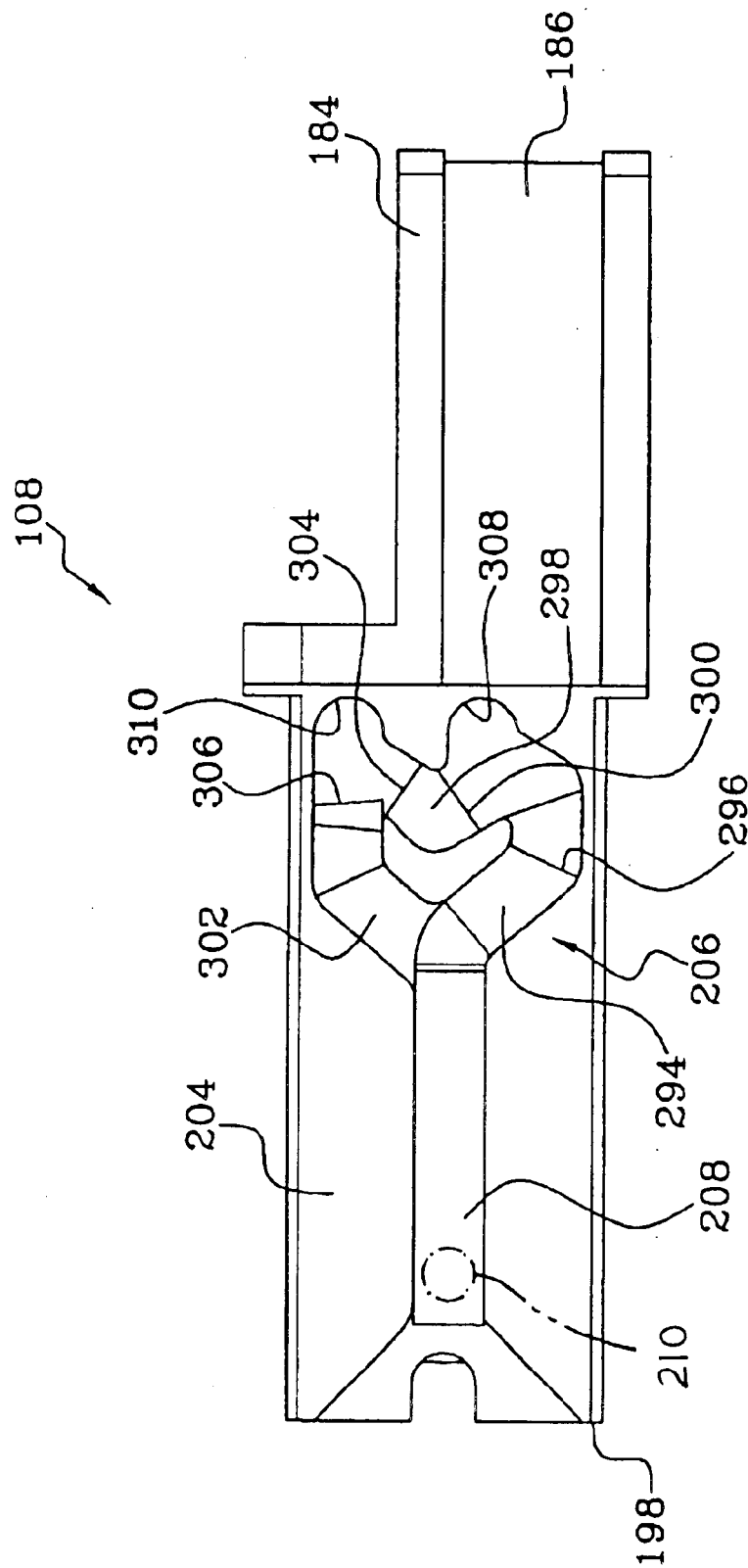
FIG. 12 is a side elevation view of the carriage of FIG. 10, showing the cam.

FIG. 12 shows the shape of the cam 206 which is formed by a recess in the carriage 108. When the carriage is in it initial rear position, prior to card insertion, the first part 210 of the cam follower lies in a longitudinally-extending groove 208. When the carriage is pushed rearwardly by a card, the cam follower first part 210 moves down along a section 294 with a ramp 296 until it engages a stop wall 308. When the cam first part engages the stop wall 308, the carriage is in a front overtravel position. After the part 210 engages the stop wall 308 the carriage moves forward slightly to its front working position while the cam part 210 moves against a retain section 298. When the card must be removed, it is pushed forward and the carriage is pushed forward to its overtravel position, with the cam first part 210 moved against a ramp 300 that directs it against a stop wall 310. Release of the card allows the cam part to move down along an escape section 302 and back to its original position at 210, while the carriage moves to its rear position. Double click mechanisms are known.

Figure 17:
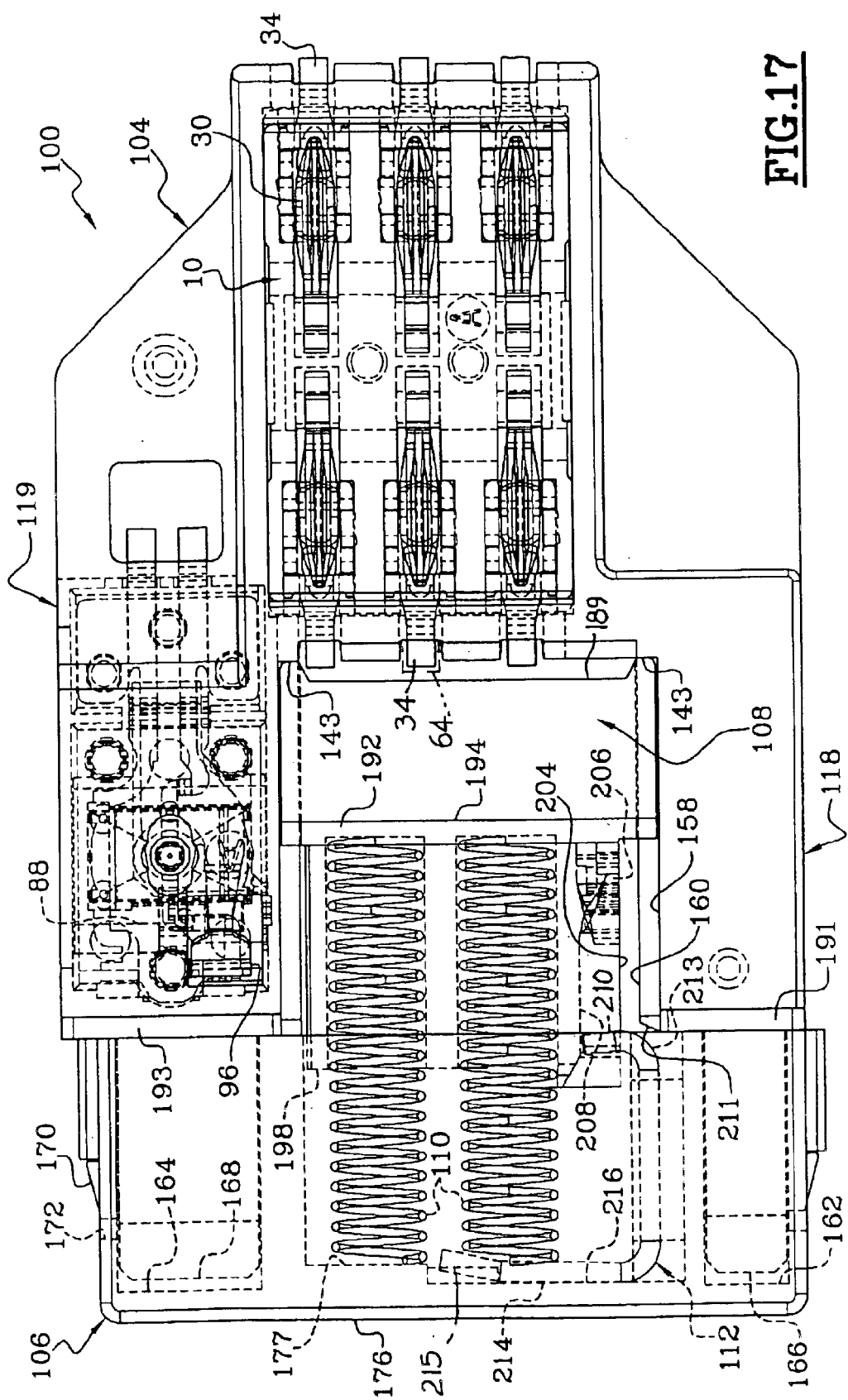
FIG. 17 is a plan view of the reader of FIG. 1, with the carriage in its forward rest position, and showing several of the components in hidden lines.
Figure 19:
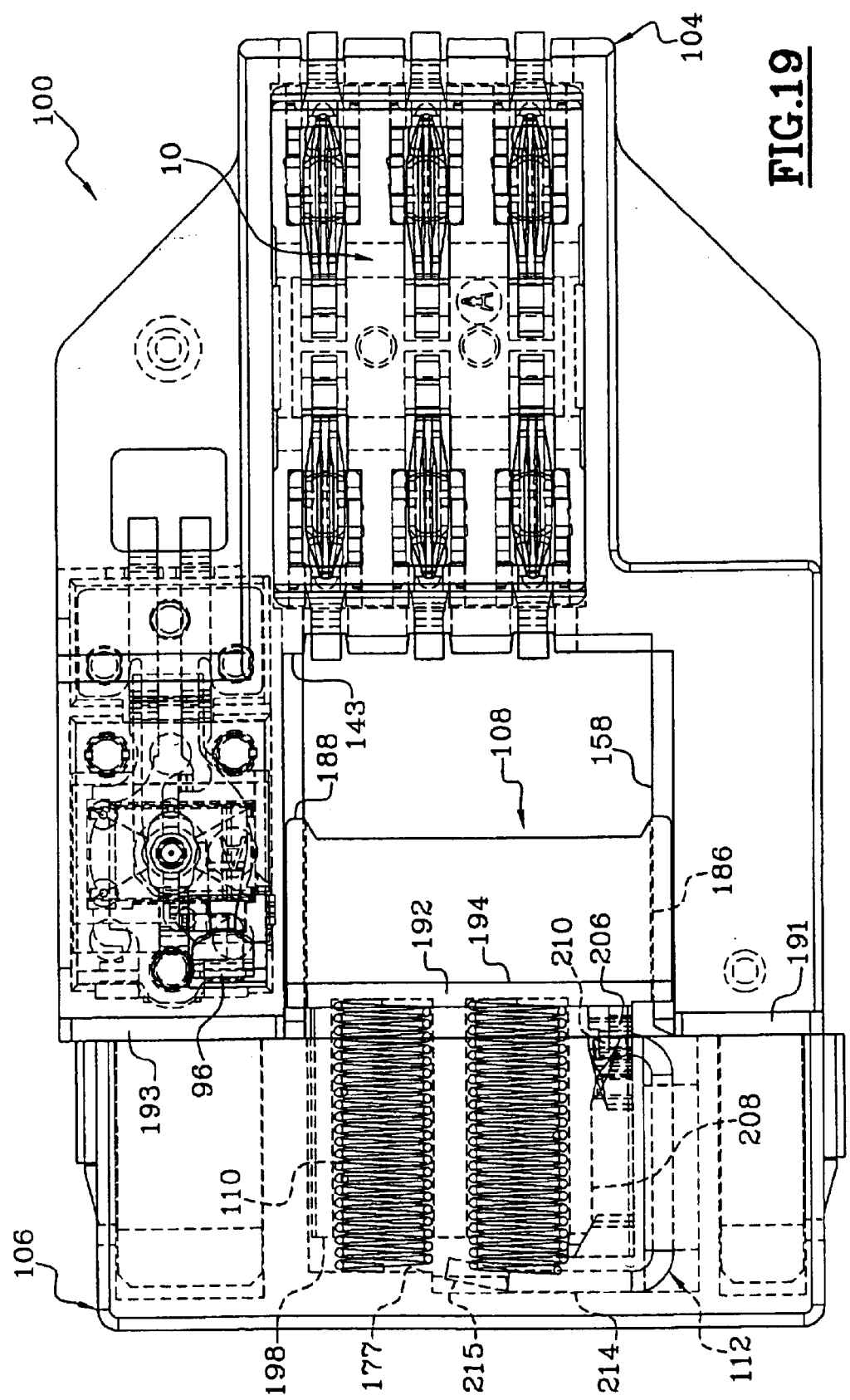
FIG. 19 is a view similar to that of FIG. 17, but showing the carriage in its rear or initial position.
Figure 21:
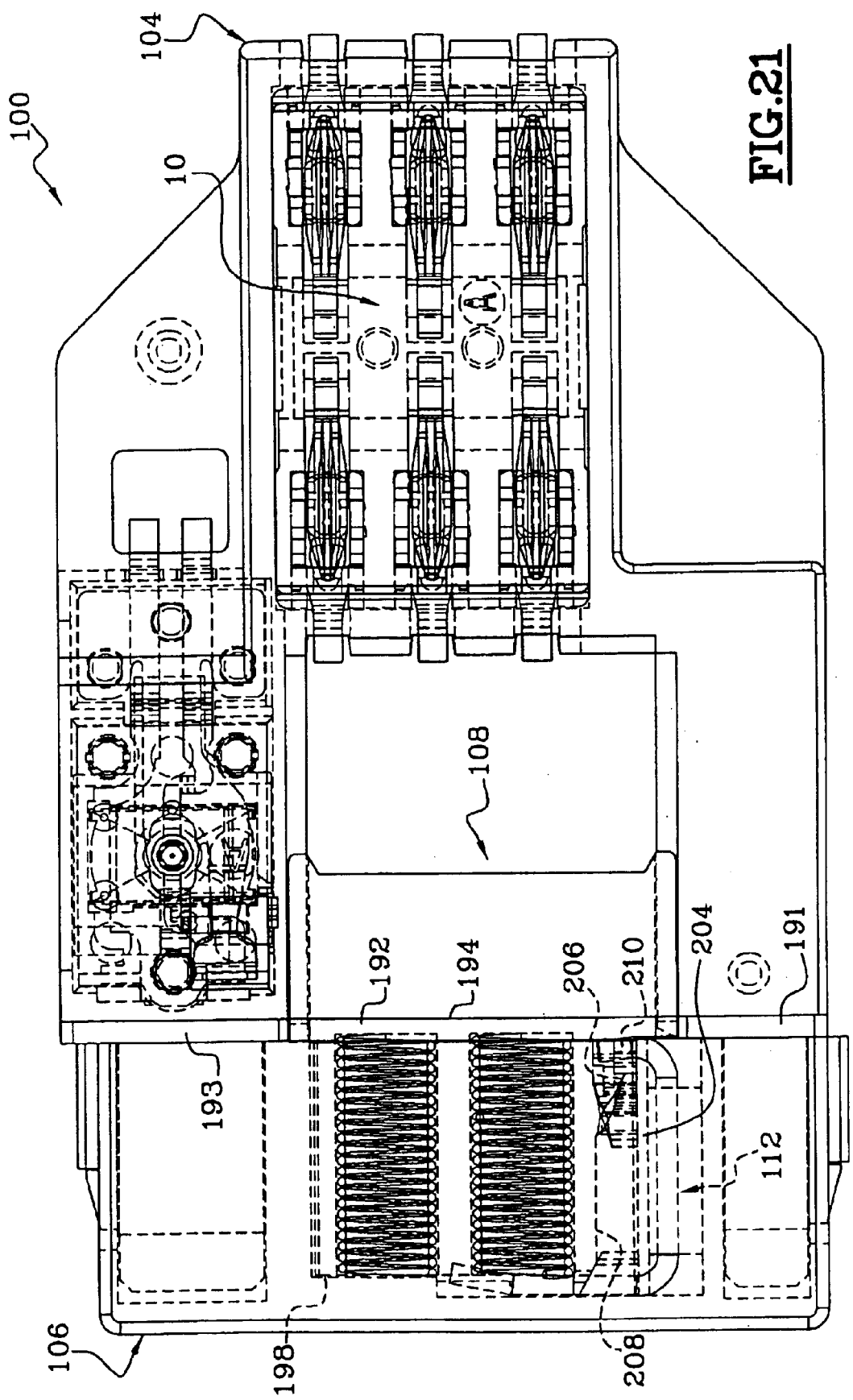
FIG. 21 is a plan view of the carriage of FIG. 19, shown in a rear overtravel position.
Figure 23:
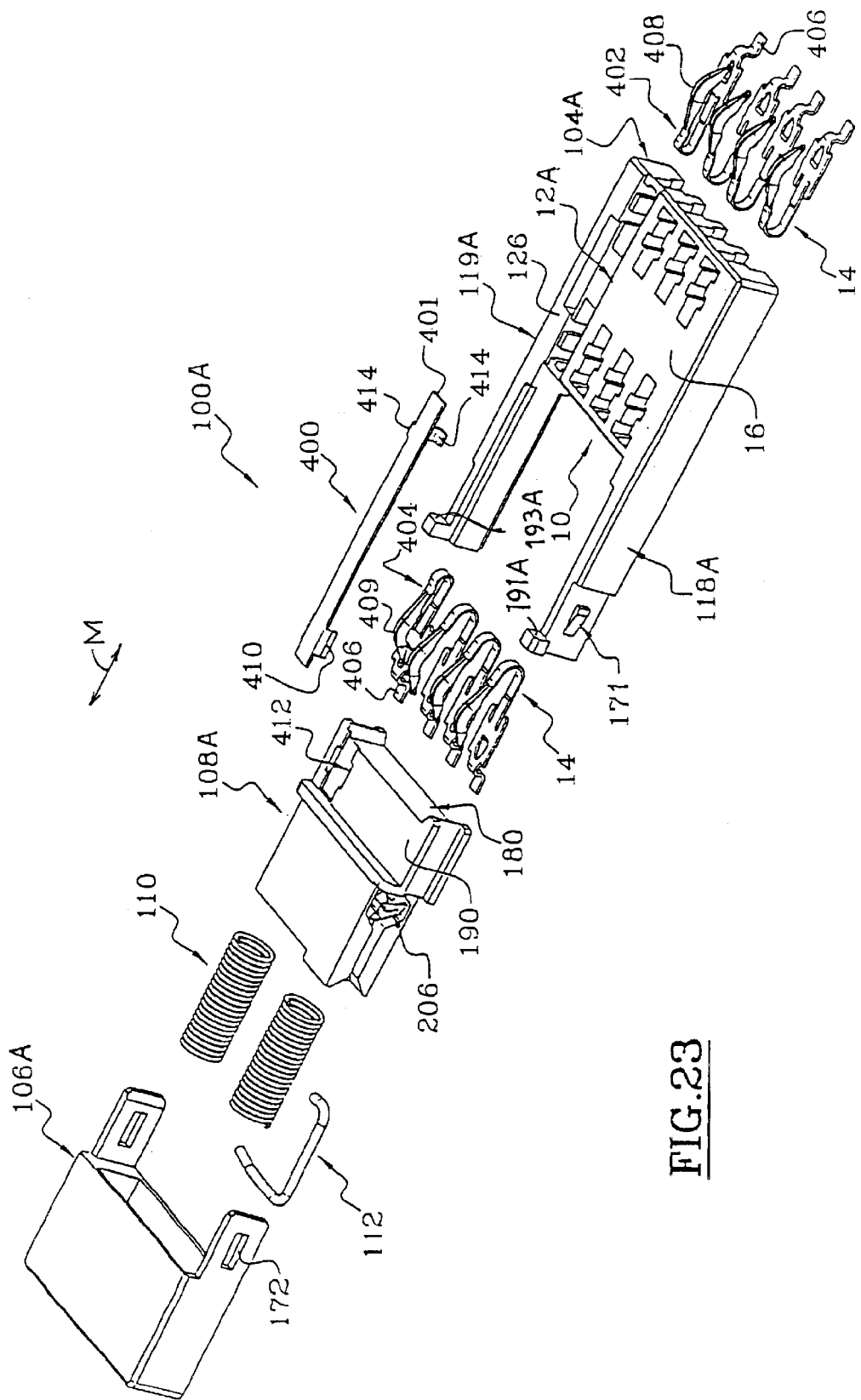
FIG. 23 is an exploded top and rear isometric view of a reader of a second embodiment of the invention, in which the contact-holding insulator is integral with the rear body of the frame and a different card-sensing switch is provided.

FIG. 17 shows the carriage 108 in its initial rear position, FIG. 19 shows the carriage in its front working position, and FIG. 21 shows the carriage in its front overtravel position. In the overtravel position of FIG. 21, the pushing surface 194 of the carriage is even with the stop surfaces of upstanding stops 191, 193. The overtravel position of FIG. 21 is not stable, as the first part 210 of the cam does not prevent rearward movement of the carriage until the carriage has moved rearward from the overtravel position to the rear working position of FIG. 19. FIG. 17 shows that one of the springs 110 presses the mount part 214 of the cam follower against a wall of the front body 106. This not only holds the first part 214 in place while allowing it to pivot, but provides friction that resists pivoting of the cam part 214 unless it is forced to pivot by walls of the cam. In a double click mechanism, this is useful to prevent the cam from falling down between the positions 308, 298 (FIG. 12) and not operating properly.

Figure 13:
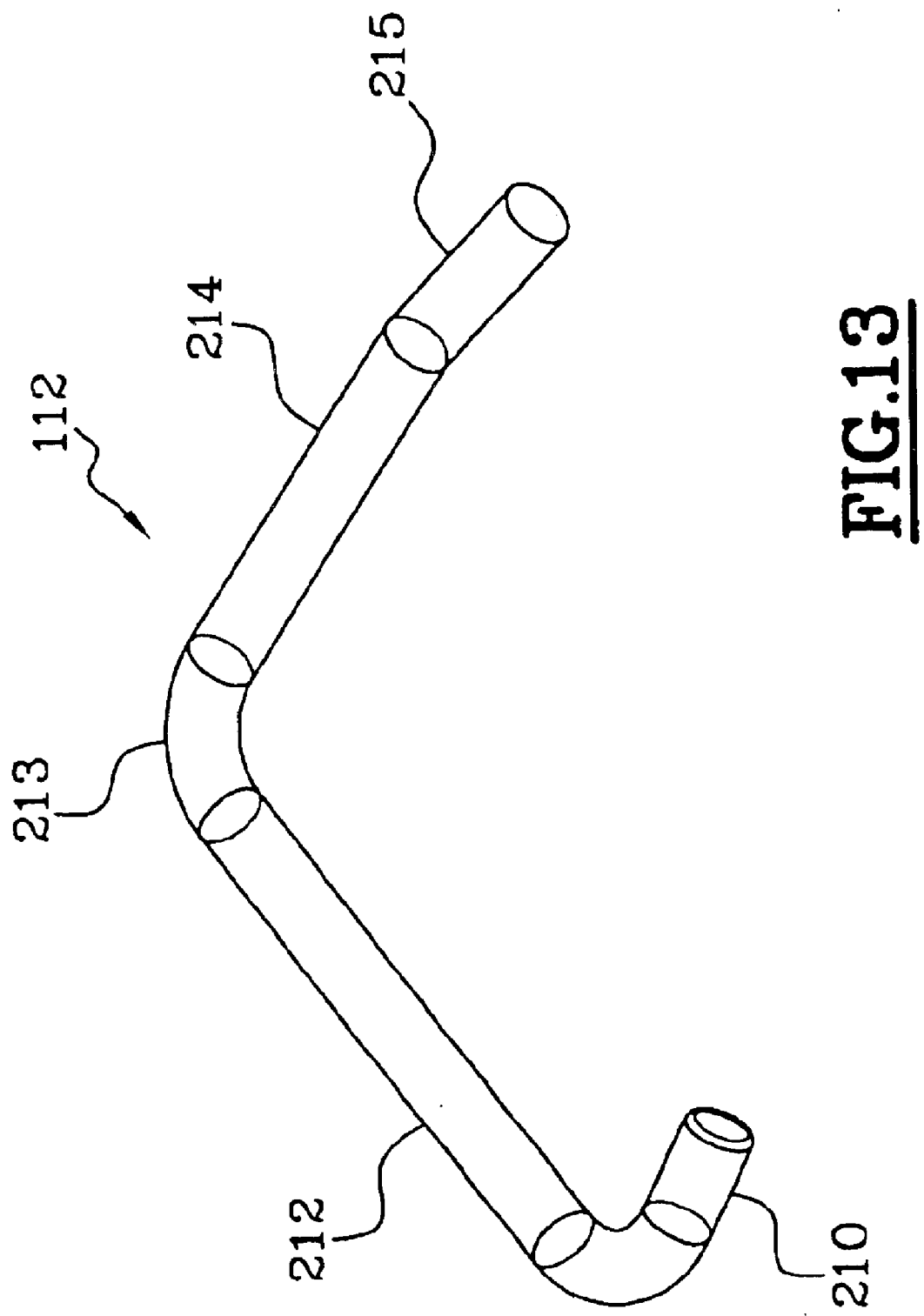
FIG. 13 is an isometric view of the cam follower which engages the cam of FIG. 12.

FIG. 13 shows that the cam follower mount part 214 has a bend at 216 that results in a far end 215 extending at a rearward incline. As shown in FIG. 17, one of the springs 110 presses against the far end 215, which urges pivoting of the mount part 214 so as to assure that the cam engaging part 210 remains fully in the recess form by the cam 208.

Figure 7:
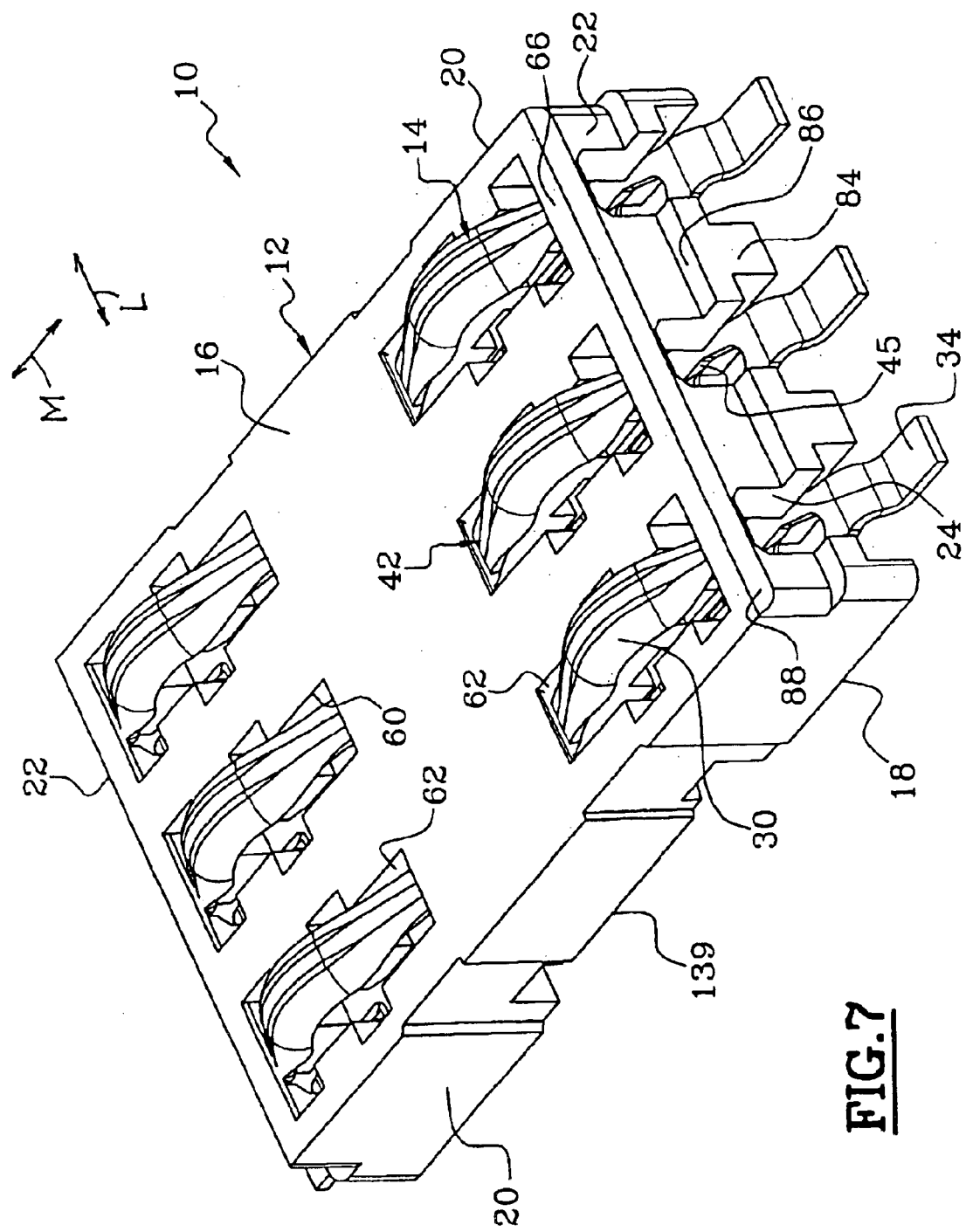
FIG. 7 is a top and rear isometric view of the insulator part with contacts therein, of the reader of FIG. 1.
Figure 8:
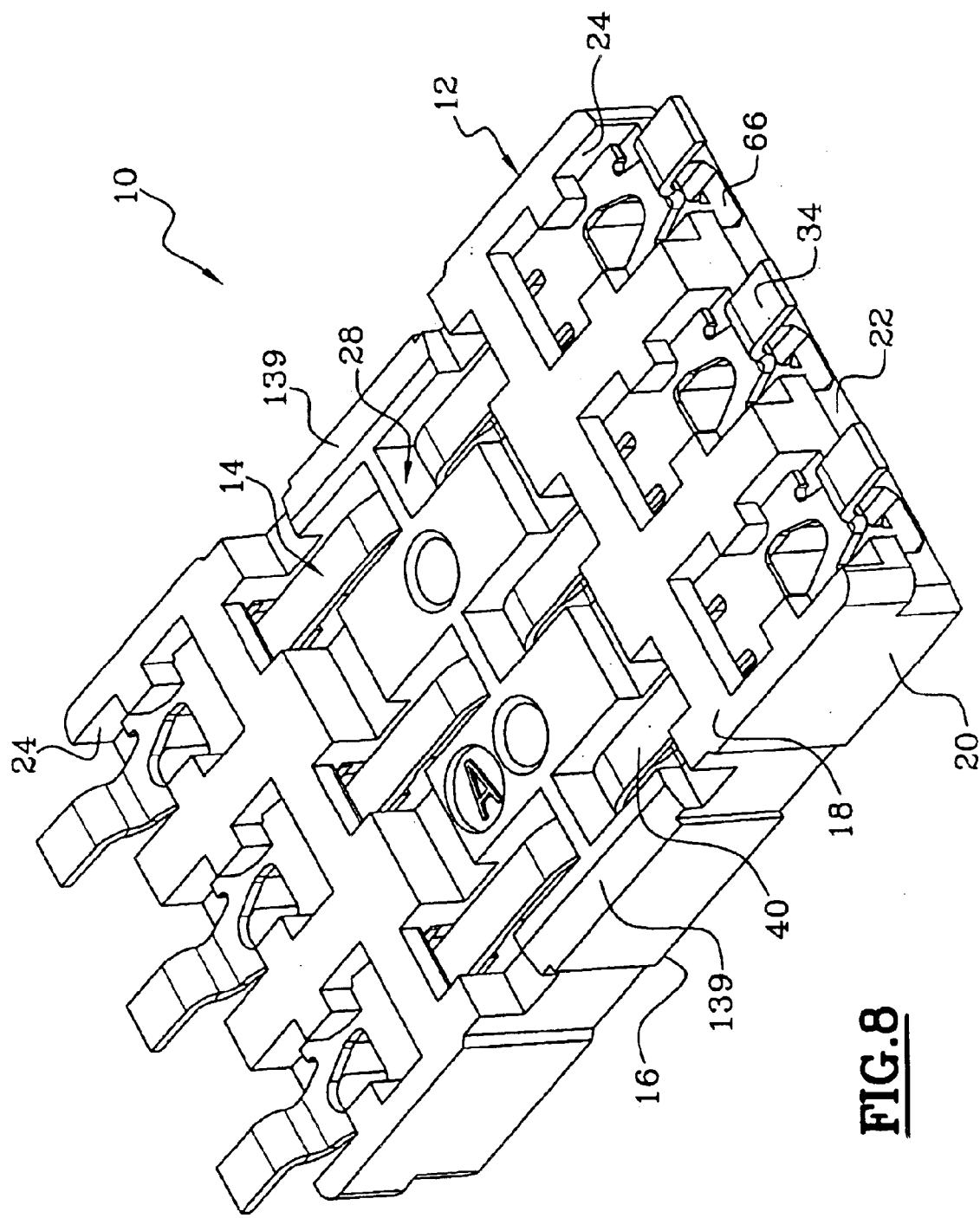
FIG. 8 is a bottom and front isometric view of the insulator and contacts of FIG. 7.

FIG. 7 shows that the insulator 12 and contacts 14 of the electrical connector 10 have double symmetry with respect to two perpendicular planes that extend in longitudinal M and lateral L directions. The upper face 16 of the insulator is flush with the surrounding portion of the frame. A front crosspiece 66 has a chamfer 88, a rim 84 that forms an upper bearing surface 86 and a hole 45. The insulator has a lower face 18 with a notch 139, front and rear faces 22 and opposite side faces 20. The six contacts lie in corresponding six cavities 24 that are open at the faces 22 and accessible from both the top and bottom of the insulator. Each contact pad-engaging part lies in a slot 60 that has lateral edges 62. Each contact has a terminal or tail 34 which is soldered to a trace on the circuit board. FIG. 2 shows one of such traces at 64.

Figure 16:
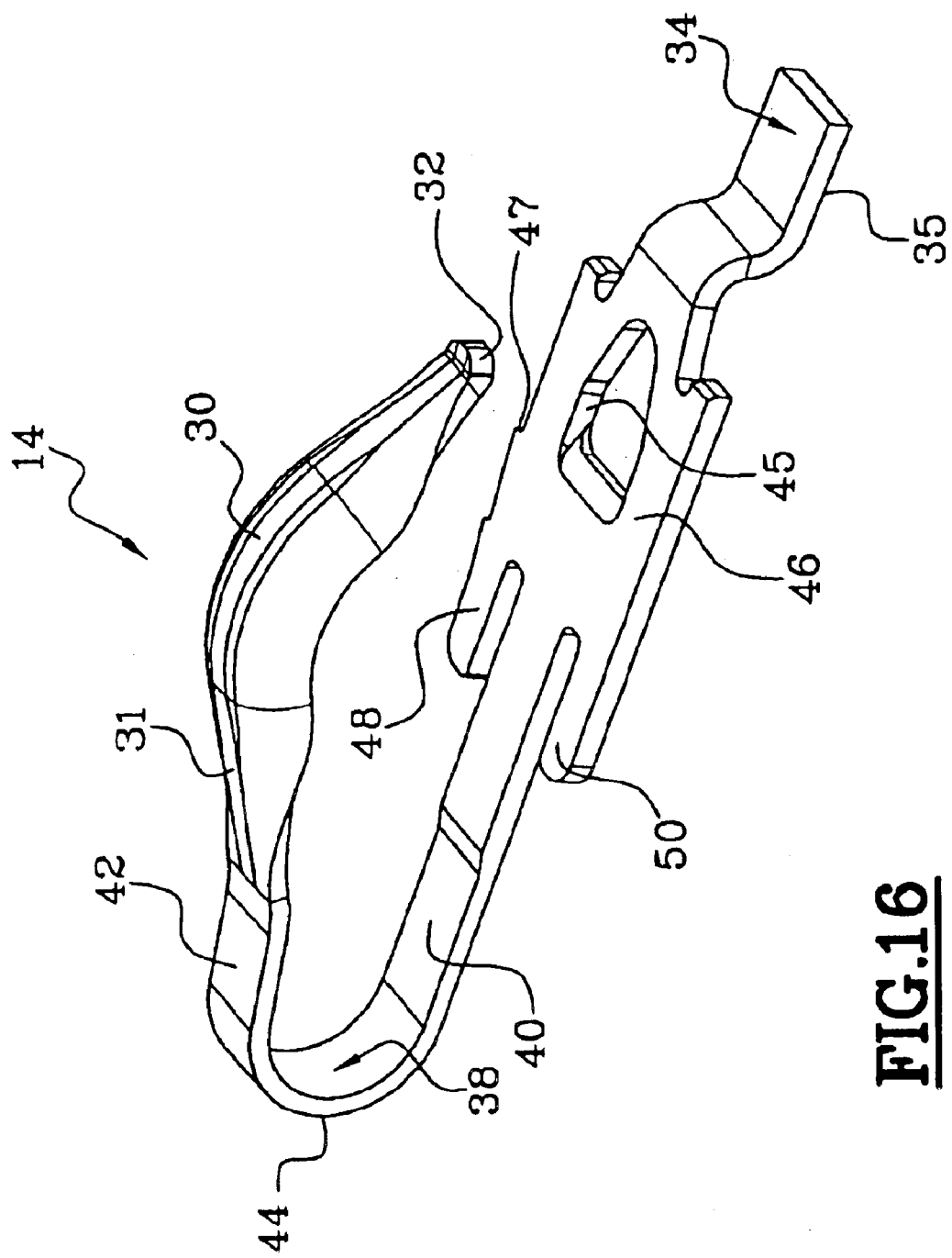
FIG. 16 is an isometric view of one of the contacts of the reader of FIG. 1.

FIG. 16 shows that each contact has a nose 32 that presses up against the insulator to limit the height of the contact end 30 and its upper surface 31. The end 30 is connected to a mount part 46 by a linking part 38 that includes first and second branches 40, 42 and a central bend 44. The mount part 46 has a harpoon 48 with teeth 47 for insertion into a slot of the insulator, and has a stabilizing tab 50 on the opposite side. The mount end has a hole 45 that can receive the nose 32 to permit large vertical movement of the pad-engaging end 30 in a contact and connector of small height. A lower face 35 of the tail 34 solders to a trace on the circuit board.

Figure 5:
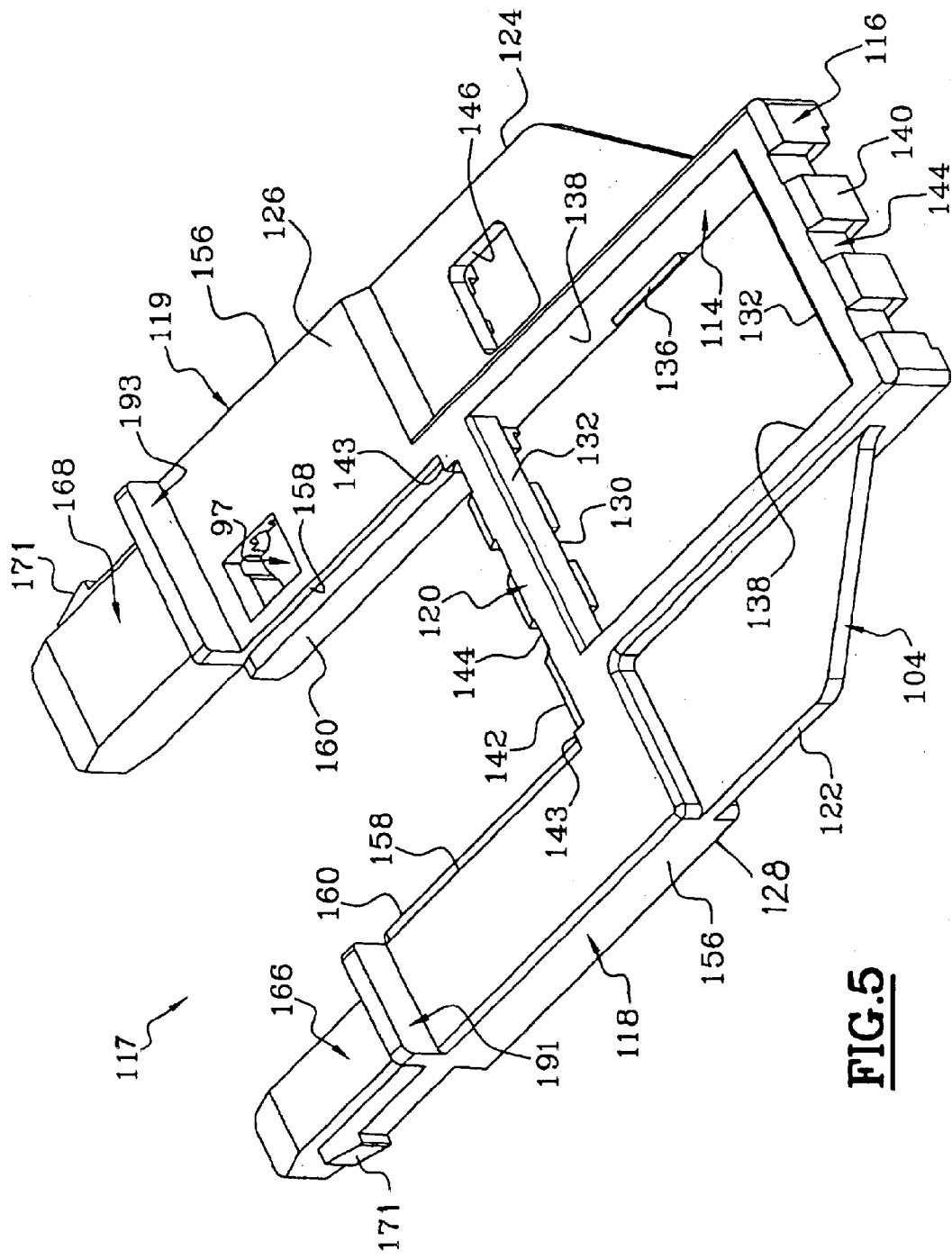
FIG. 5 is a top and rear isometric view of only the main rear body of the reader.

FIG. 5 shows that the frame rear body 104 has a vertical through opening 114 at a rear section 116 of the rear body, that receives the connector with its six contacts. The rear body has a front section 117 in the shape of a U, that includes the legs 118, 199 joined by a cross piece 120. Each leg forms one of the stop plates or stops 191, 193 that engage the front end of a card to limit forward movement of the carriage.

The rear body 104 includes reinforcing wings 122, 124 that join the rear section 116 to the rear ends of the legs 118, 119. The wings are thinner than the legs and lie about half way between the upper surface 126 and the lower surface 128. The wings rigidize the frame, but their top recesses avoid scratching an embossed smart card. The insulator 12 is inserted from the bottom of the main or rear body 104 up against a lower surface 130 (FIG. 5) of a rim 132 of the opening 114. The connector is held in place by lugs 136 near lower edges of opposite sides 138 of the opening. The sides 138 are thin and can bend to engage notches 139 (FIG. 7) in the insulative body.

Figure 3:
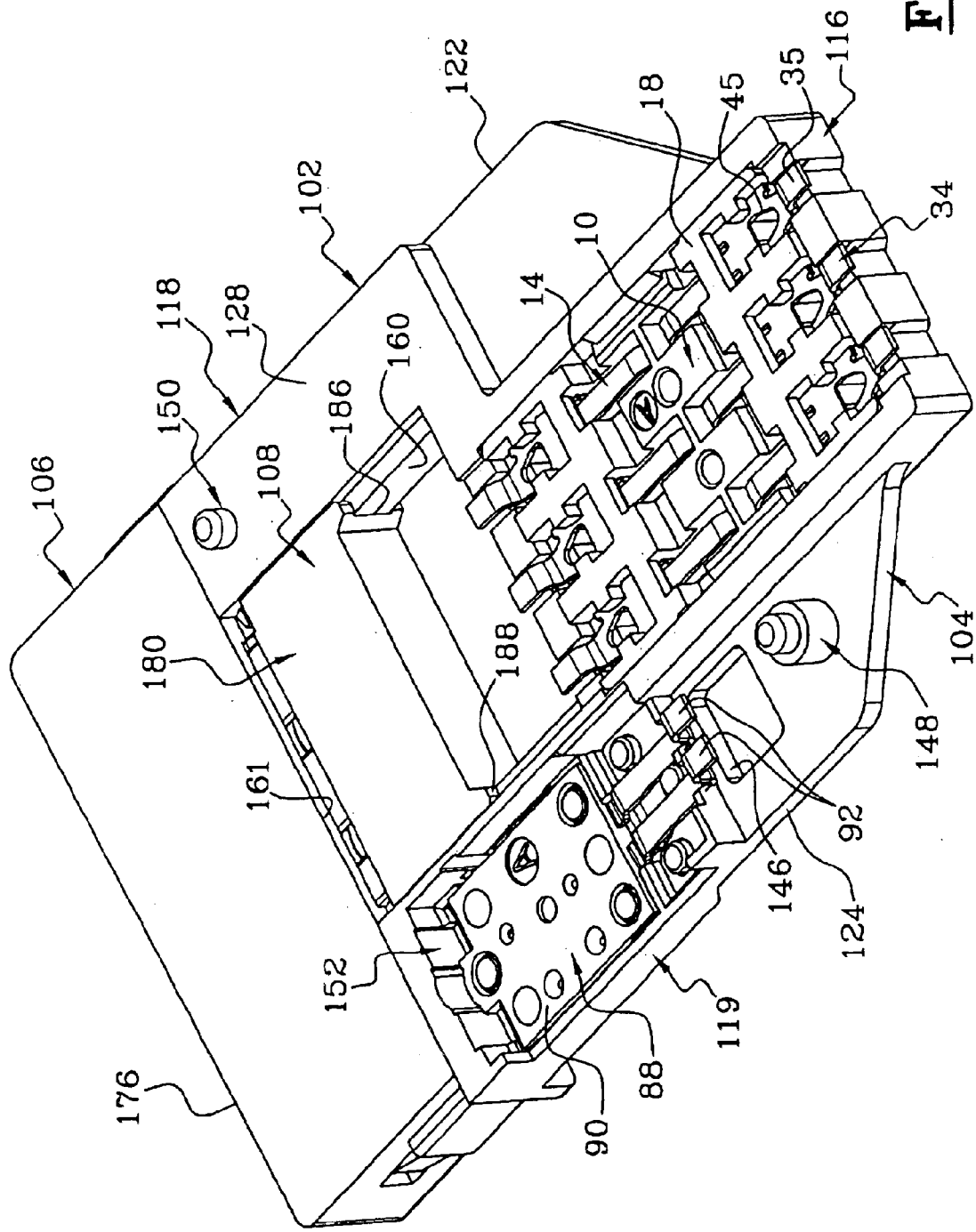
FIG. 3 is an isometric bottom and rear view of the reader of FIG. 1, with the carriage shown in a front overtravel position that is slightly forward of the position of FIG. 2.
Figure 4:
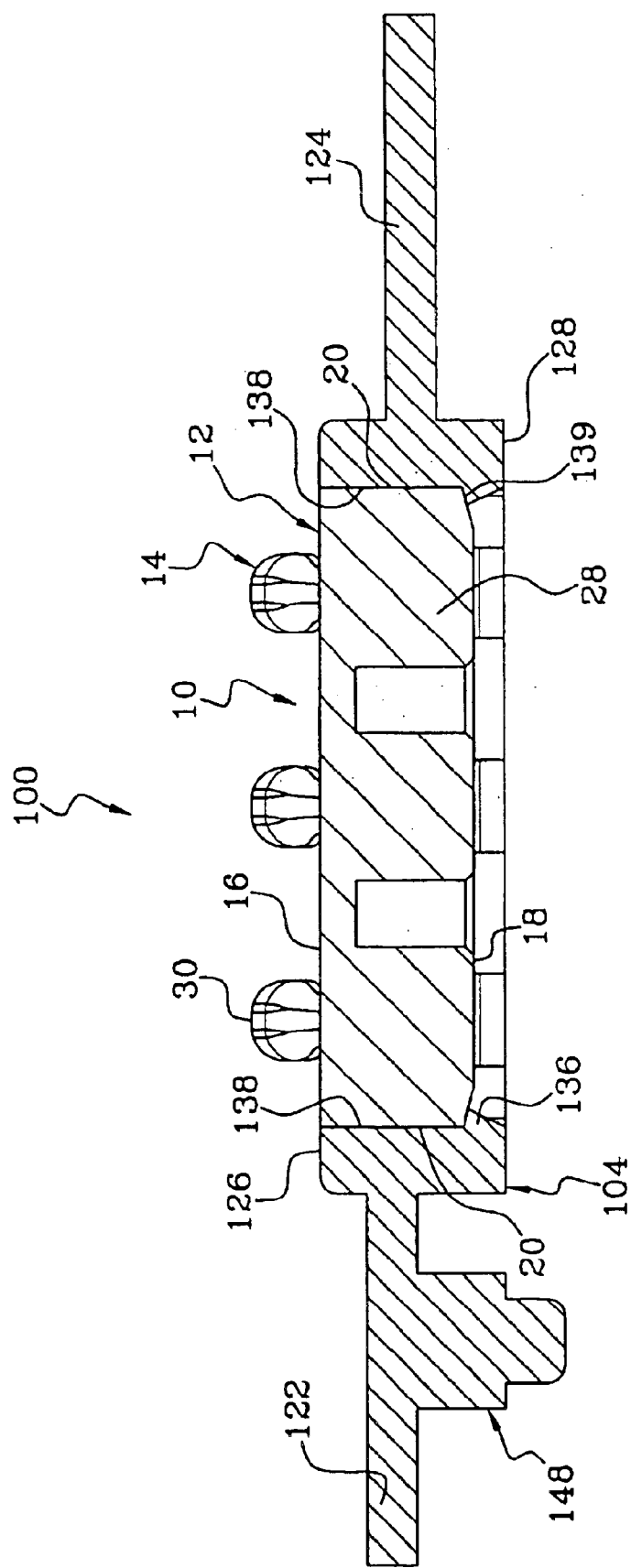
FIG. 4 is a sectional view of the reader of FIG. 1, taken along a vertical plane.
Figure 6:
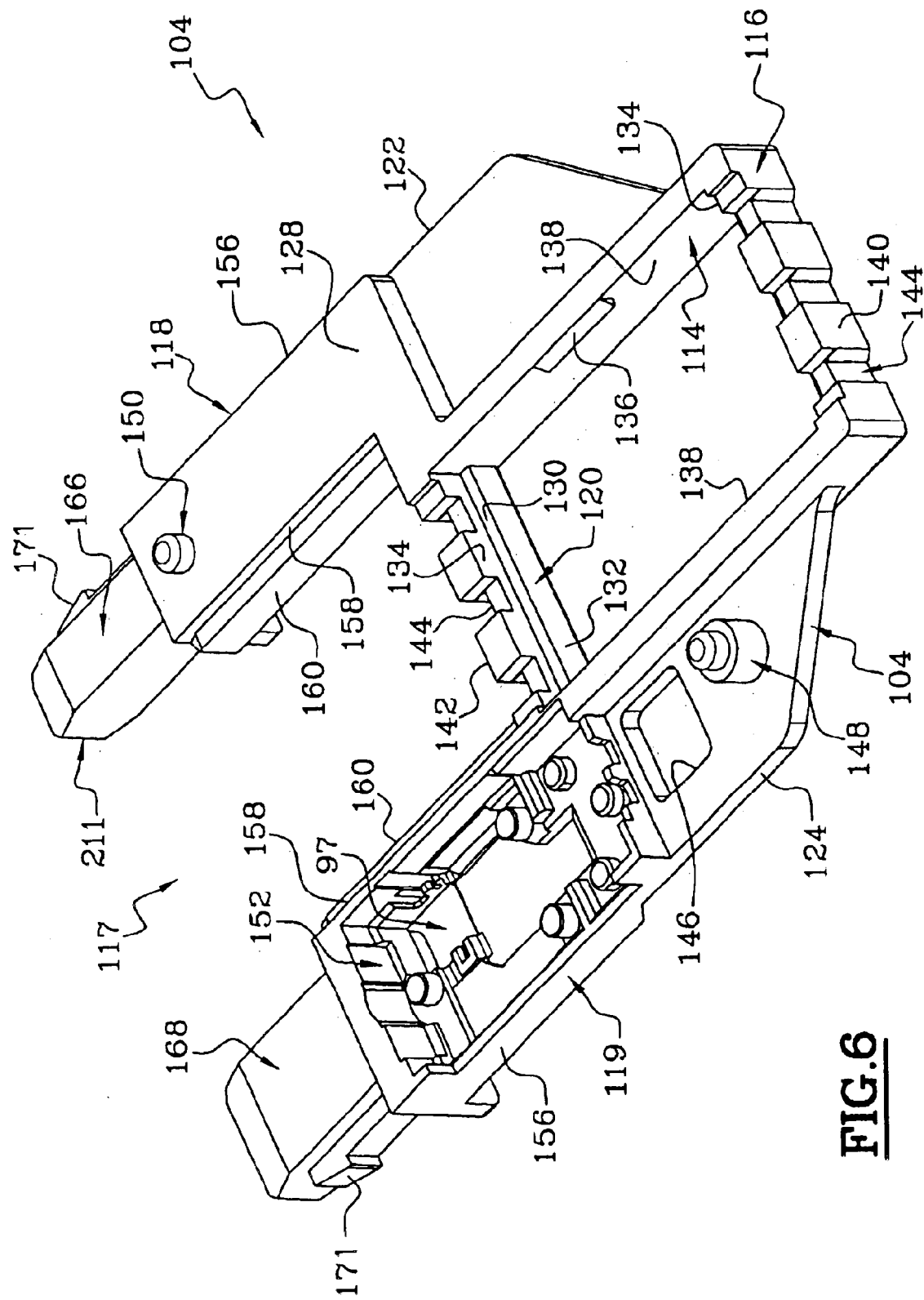
FIG. 6 is a bottom isometric view of the main body of FIG. 5.

The rear portion of the main or rear body 104 (FIG. 5) has rear and front faces 140, 142 with notches 144 that allow access to the tails of the contacts for soldering operations. One of the wings 124 has a window 146 through which tails of switch contacts can be soldered to traces on the circuit board. FIG. 6 shows that the wing has a stud 148 which, with another stud 150 on a leg, fit into holes on the circuit board to position the rear body on the board. A recess 152 in one of the legs 119, is designed to receive a switch 88 (FIG. 3) that includes a switch body 90 and a pair of switch contacts with tabs 92 that are aligned with the window 146. FIG. 1 shows that the actuator or pedal 96 of the switch extends through a hole 97.

Figure 9:
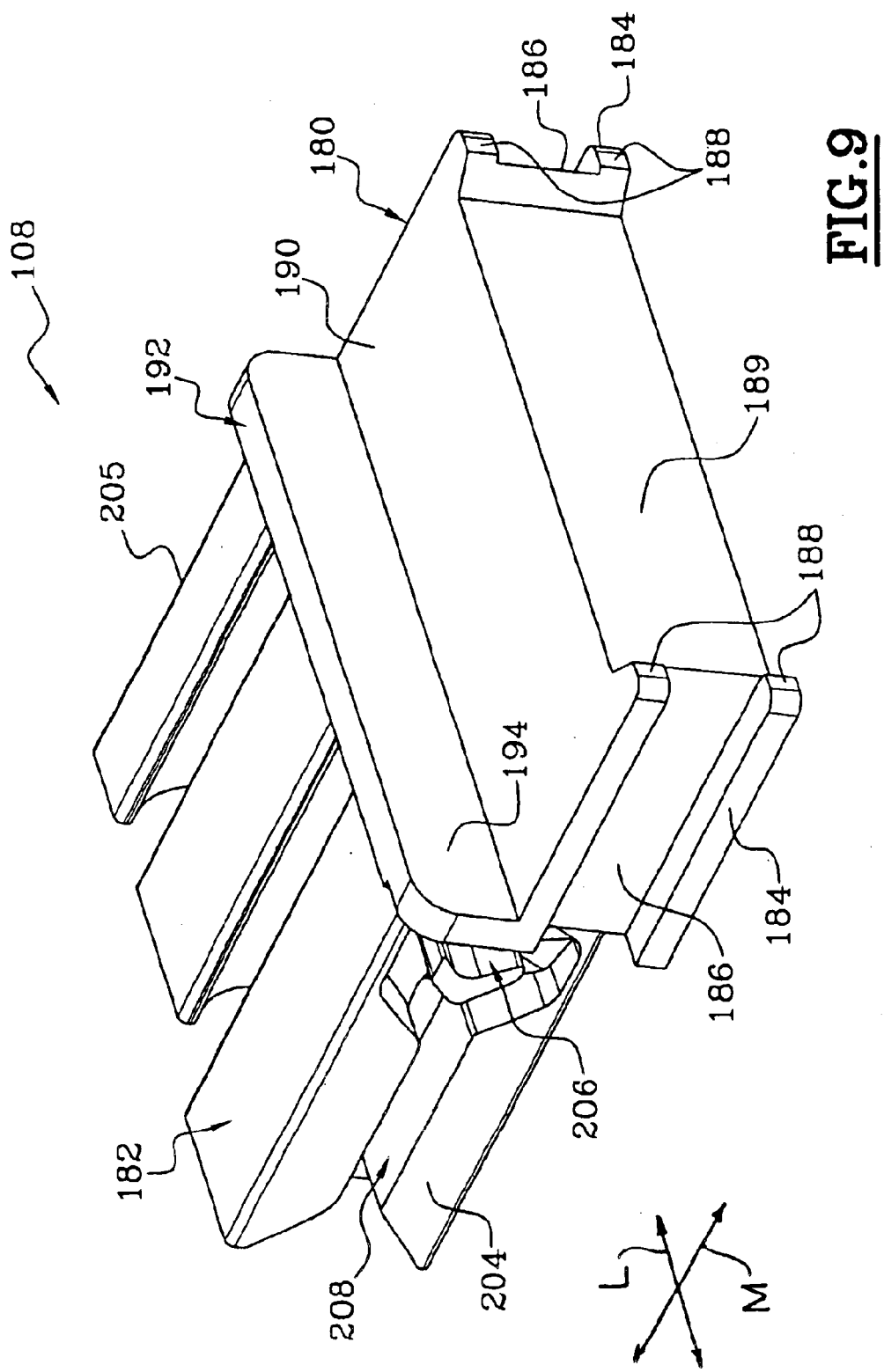
FIG. 9 is a top and rear isometric view of the carriage of FIG. 1.

FIG. 5 shows that the sides of the legs 118, 119 that face each other and the carriage, form rails 160 and recess faces 158 above and below each rail. The space between the legs is open forward of the legs, to allow the carriage to be inserted rearwardly between the legs. As shown in FIG. 9, the carriage 108 has a groove slideway 186 at each side, with flanges 184 at each slideway that lie above and below the rail that guides the carriage. The flanges 184 help rigidize the carriage.

FIG. 14 shows that the front body 106 has walls 210, 211 that form largely isolated side cavity portions 162, 164, although most of such isolating walls are not necessary except for rigidity. The central cavity 174 is open rearwardly, and has a front wall 176 that closes the front of the front body. FIG. 9 shows that the carrier has a front portion 182 that slides forward and rearward within the central cavity portion of the front body. The rear portion 180 of the carriage is guided by the rails of the legs. The rear portion 180 of the carriage is of solid plastic (no holes).

The rear portion 180 of the carriage has stops 188 on laterally opposite sides. As shown in FIG. 17, the stops abut side parts 143 at the rear end of the space between the legs 118, 119 that the carriage 108 slides in. This leaves a space between much of the rear face 189 of the carriage and the facing surface of the frame. The tails 34 of the pad-engaging contacts lie in this space. The space allows a moderate volume of solder on the corresponding tails 34 and traces 64 on the circuit board without interfering with a carriage that extends vertically by substantially the entire thickness of the frame.

Figure 10:
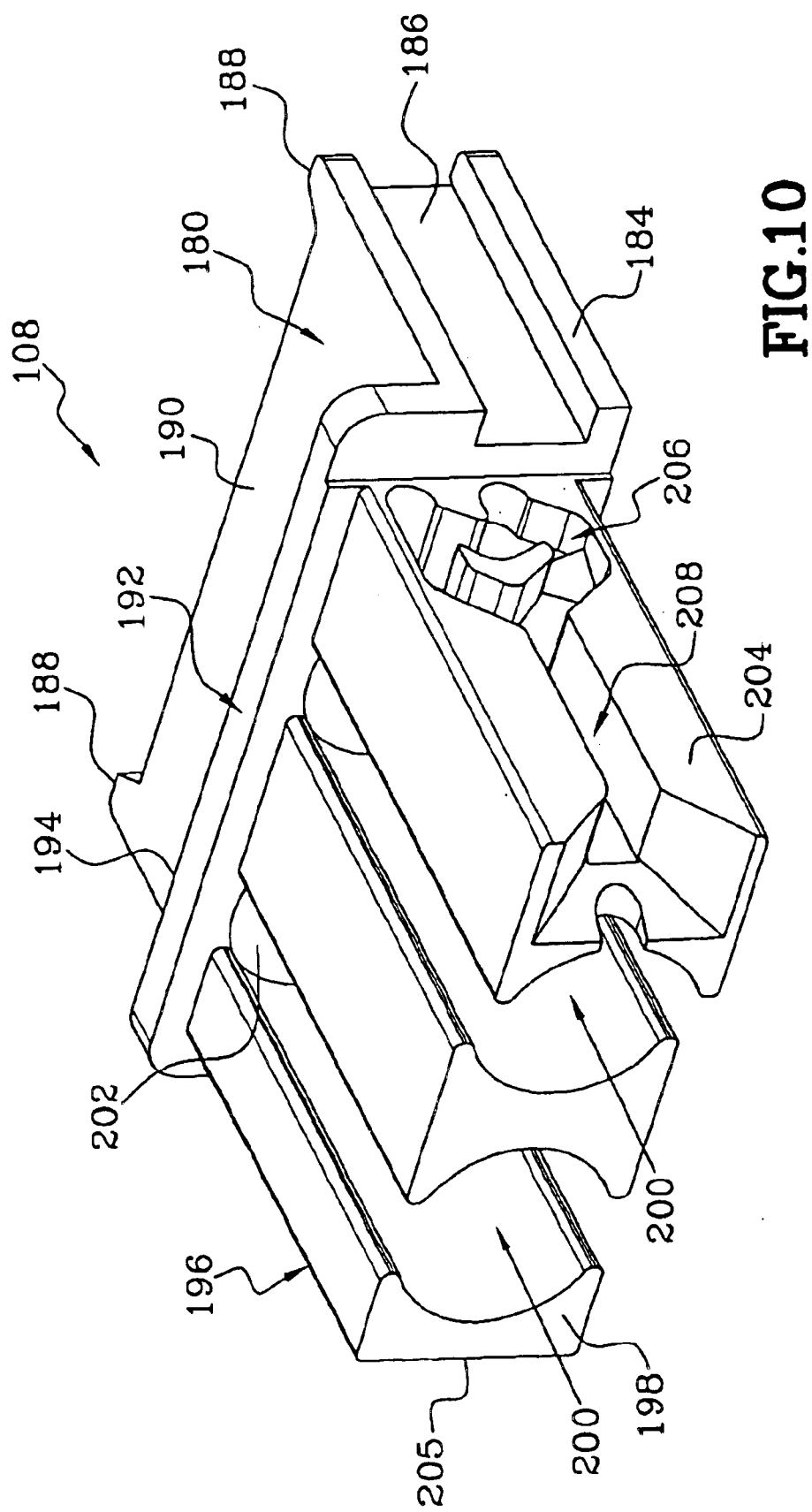
FIG. 10 is a rear and top isometric view of the carriage of FIG. 9.
Figure 11:
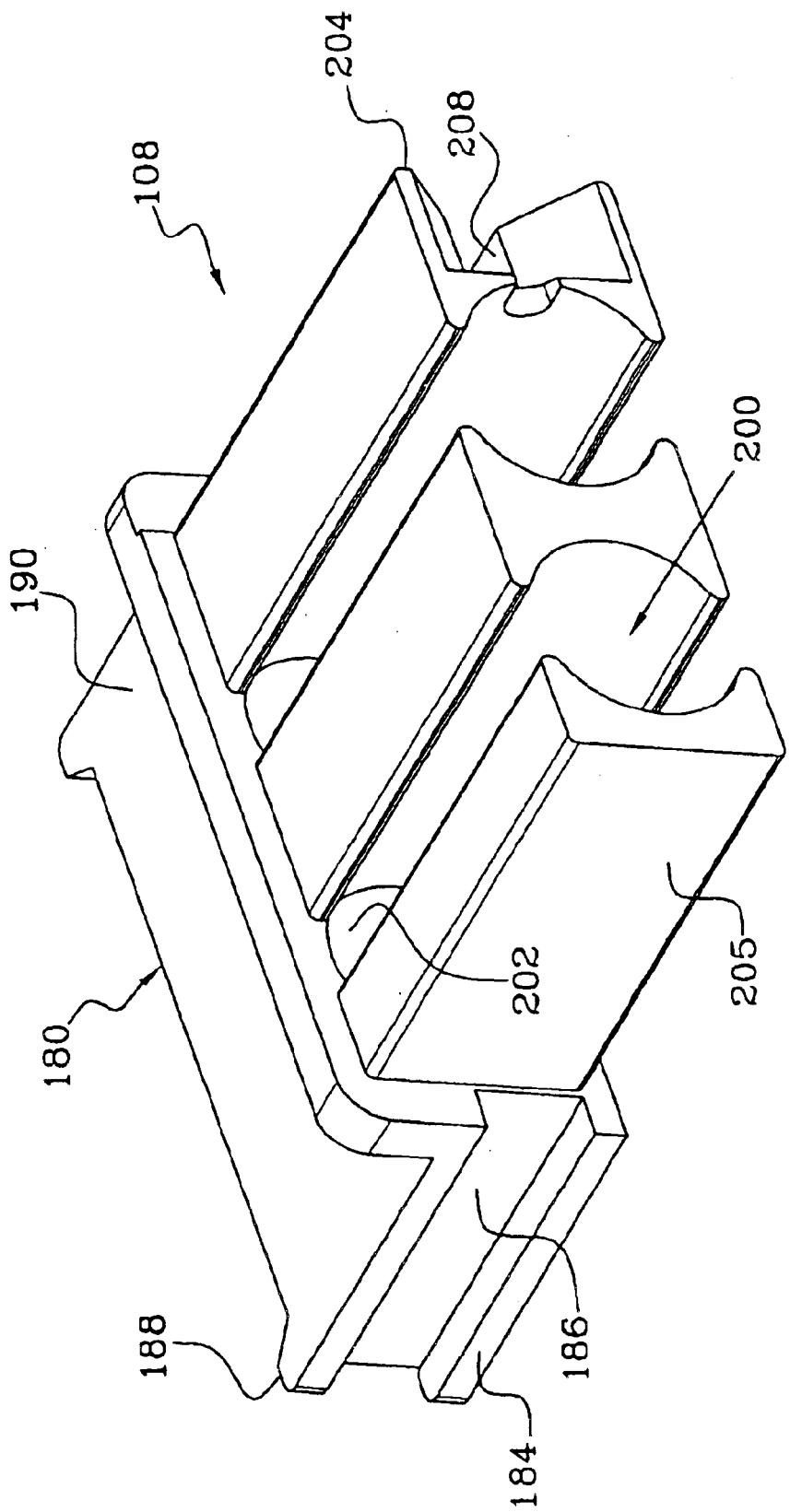
FIG. 11 is a rear and top isometric view of the carriage of FIG. 10, showing the opposite side.

FIG. 10 shows that the carriage front portion 182 has a largely rectangular overall shape that fits closely in the central cavity portion of the front body. The carriage front portion has two largely cylindrical passages 200 that each holds the rear end of one of the two helical springs, the springs abutting a convex wall 202 at the rear end of each passage. FIG. 14 shows that the central cavity portion 174 has laterally opposite walls that guide the carriage in movement, including wall 210 and short walls 208. The springs that lie in the passages 200 shown in FIG. 10, apply a force on the order of eight newtons to the carriage. The springs have a diameter of about 2.4 mm which is almost the height of the carriage front portion 182. The passages 200 are each open at their top and bottom. This minimizes the required height of the carriage front portion and therefore the height of the front body that receives it, while enabling the use of compression springs of maximum diameter. The carriage front portion 182 has walls forming opposite sides 204, 205. The recess forming the cam 206 lies in the side 204, and the top and bottom of the wall 204 guides the corresponding side of the carriage front portion.

The carriage side 204 is a cam-forming wall that has the recess that forms the cam 206. The side or wall 204 lies in a vertical plane that is normal to the lateral direction L (FIG. 9). This minimizes the width of the double click mechanism. In addition, the mount part 214 of the cam follower lies directly behind the wall 204 that forms the cam recess, or cam. As shown in FIGS. 10 and 14, there is limited width that can be occupied by the double click mechanism, in view of the need for spring-holding passages 200 (FIG. 10) and side cavity portions 162, 164 (FIG. 14).

FIG. 14 shows that the short walls 208 of the front body which lie at the top and bottom, engage the corresponding wall of the carriage front portion. The walls forms a longitudinally-extending groove 212 that receives the cam follower. A portion of the mount part of the cam follower lies in slots 216, with the second part lying in the groove 212 and holding the free end that engages the cam. The groove 212 has a front end of small height and a rear end of large height to confine the front end of the cam follower while allowing the rear end to move vertically in the cam recess.

The upside-down view of FIG. 6 shows that a location 211 at the front end of the rail 160 forms a stop that can abut the cam follower and prevent it from moving forwardly out of the side of the center cavity. FIG. 17 shows that the rail front end 211 lies in line with the cam follower 112.

An additional stop portion is provided that limits rearward movement of an inserted card. FIG. 2 shows the upstanding stops 191, 193 of the frame that abut the rear edge of a card. If the pushing face 193 of the carriage should be pushed rearward of the stops 191, 193, then the rear face 161 (FIG. 1) of the front body abuts the front surface of the stop wall 192 of the carriage to limit its forward movement. Such additional stop is useful in the event that a card or other device is inserted rearwardly and does not abut the stops of the frame rear body. Normally only the stops 191, 193 (FIG. 2) limit card and therefore carriage forward movement.

A person inserts the card C (FIG. 2) into the card slot and applies slightly greater force at the end to push the carriage forwardly until the card hits the stops 191, 192. The stops on either side of the carriage help stabilize the card orientation. The person then releases the card and feels the card moving forwardly slightly (e.g. 1 mm) until it stops moving. This provides assurance to the person that the card has been fully inserted. To remove the card, the person pushes forwardly on the rear end of the card, the card then being pushed rearward by at least five millimeters and usually at least seven millimeters, so the person can grasp the card and pull it out. In a card of the construction illustrated in FIGS. 1–22 that applicant has designed, the frame 102 had an overall height of 2.4 mm between its card adjacent face 126 (FIG. 1) and its lower face 128 that lies substantially against the circuit board. The thickness of the frame between the lower face 128 and the upper face of the top of the front body 106 is about 4 mm. The width between opposite sides of the front part 106 is approximately 23.5 mm. The height of the reader can be reduced by about 20% by using largely flat contacts without the center bend shown at 44 in FIG. 16.

The small overall size of the reader allows it be manipulated by automatic pick-end-place machines that grip the upper face 190 (FIG. 1) of the carriage. Positioning and soldering are carried out with the carriage in its initial rearward or rest position, to minimize high stresses applied by the compression springs during heating in the course of soldering. Such heating can weaken the molded plastic.

FIGS. 23–26 illustrate a narrow reader 100A of a second embodiment of the invention. One difference between the two embodiments of the invention is that in the second embodiment of FIG. 23, the insulating body or body part 12A is integrally molded with the rest of the main or rear body 104A. The two sets of contacts 402, 404 include switch contacts 408, 409 with tails 406 that are soldered to switch traces on the circuit board. A means for detecting full insertion of a card includes a longitudinally M elongated blade 400 that moves with the carriage 108A. The blade has a front end with a pair of tabs 410 that are fixed in a slot 412 of the carriage. The blade has a rear end 401 with a pair of tabs 414 with one of the tabs 414 lying slideably in a groove of the rear body. A pair of legs 118A, 119A of the rear body have lugs 171 that snap into slots 172 on flanges of the front body 1 06A. The reader is only sightly wider than the carriage. Due to the narrowness of the stops 191A, 193A, the card is more likely to be tilted about a vertical axis in its fully inserted position.

Figure 24:
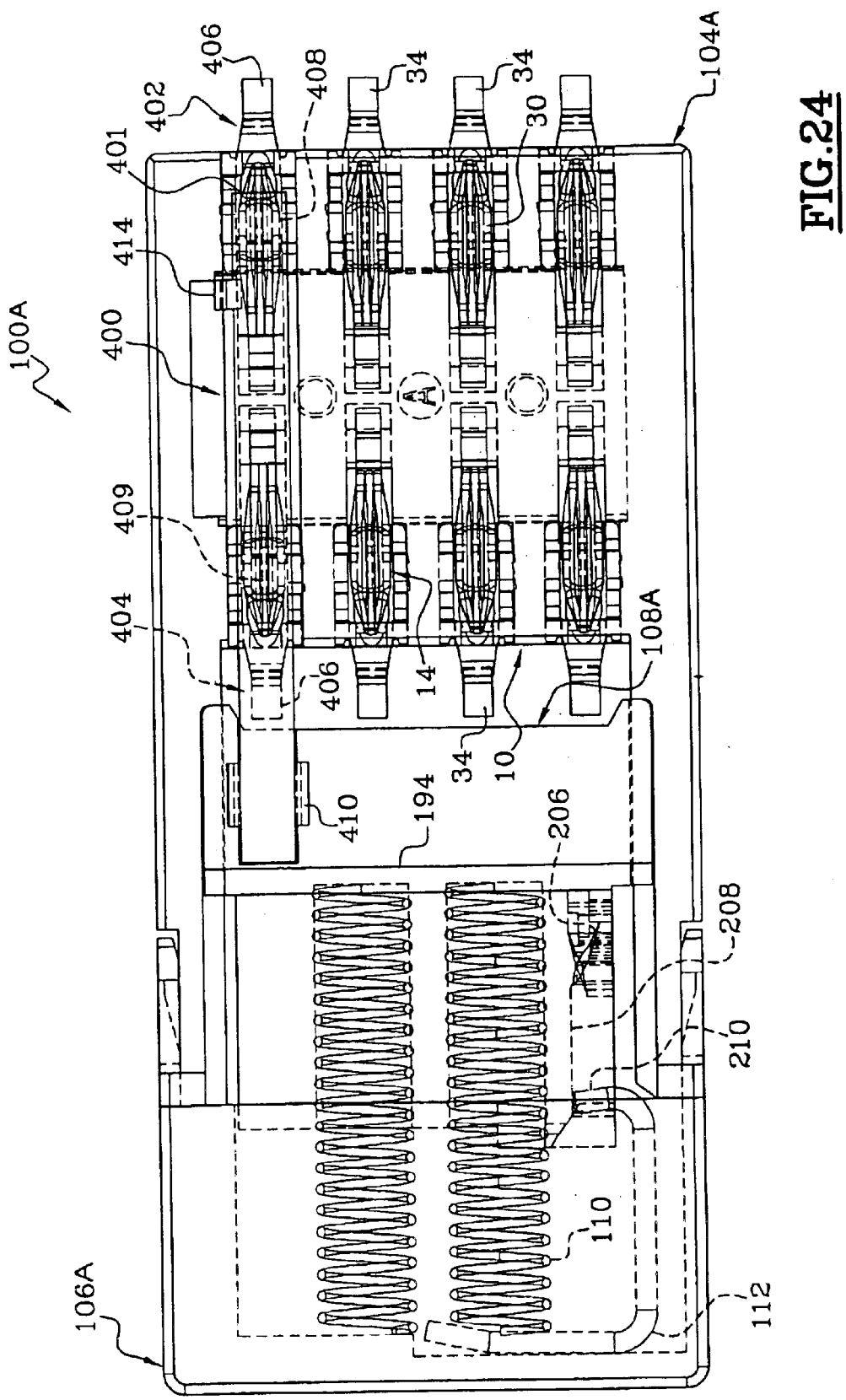
FIG. 24 is a plan view of the assembled reader of FIG. 23, with the carriage in its rear initial position, and showing components in hidden lines.
Figure 25:
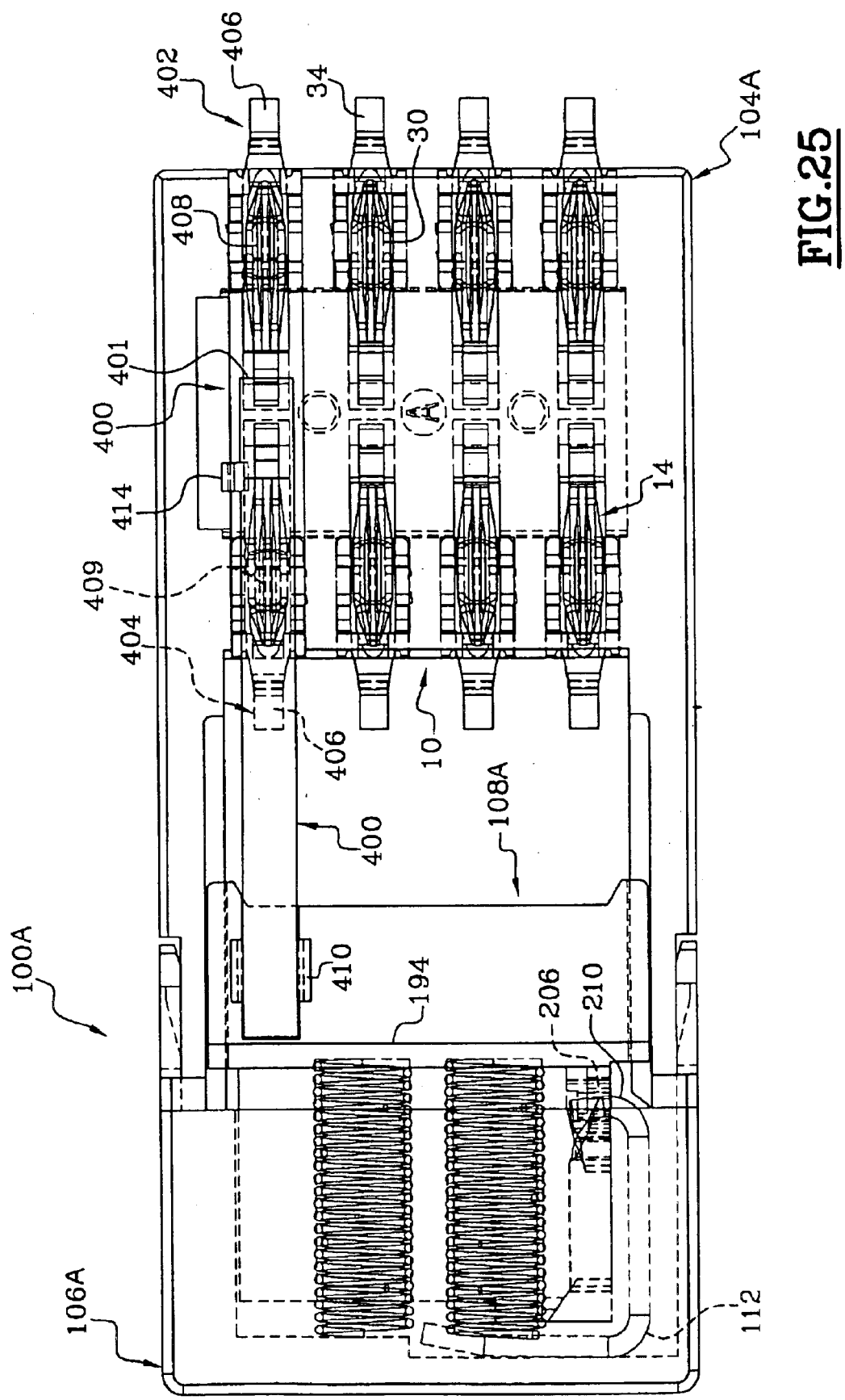
FIG. 25 is a view similar to FIG. 24, showing the carriage in its rear position.
Figure 26:
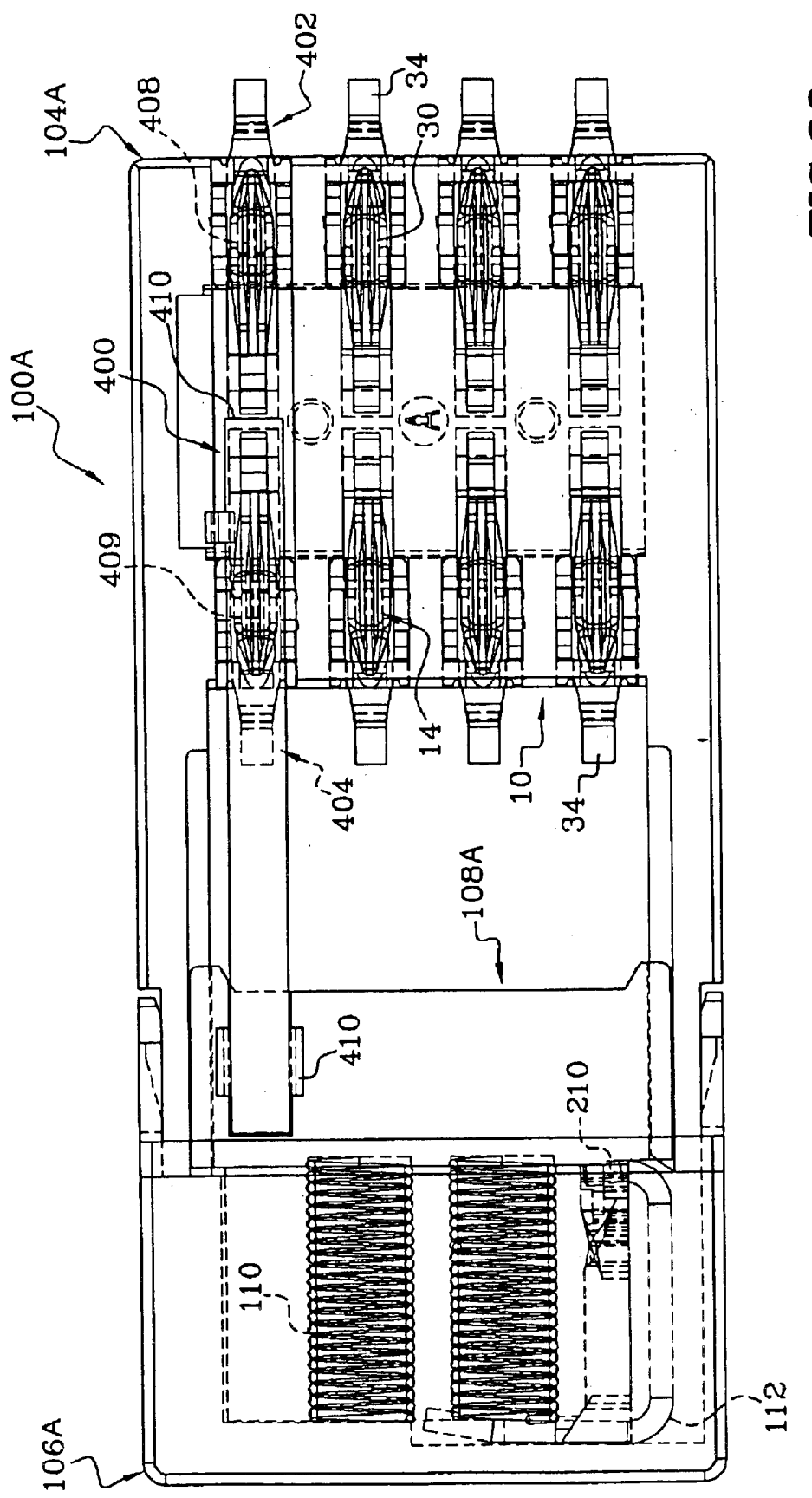
FIG. 26 is a view similar to FIG. 25, but showing the carriage in its rear overtravel position.

FIG. 24 shows the carriage in its initial rearward position, wherein the contact blade 400 engages both switch contacts 408, 409. However, when the carriage moves to its forward working position shown in FIG. 25, the rear end 401 of the blade no longer engages the rearmost switch contact 408. As a result, current no longer flows through the forward switch contact and through the blade 400 to the rearward switch contact, indicating that the card has been fully inserted.

Figure 27:
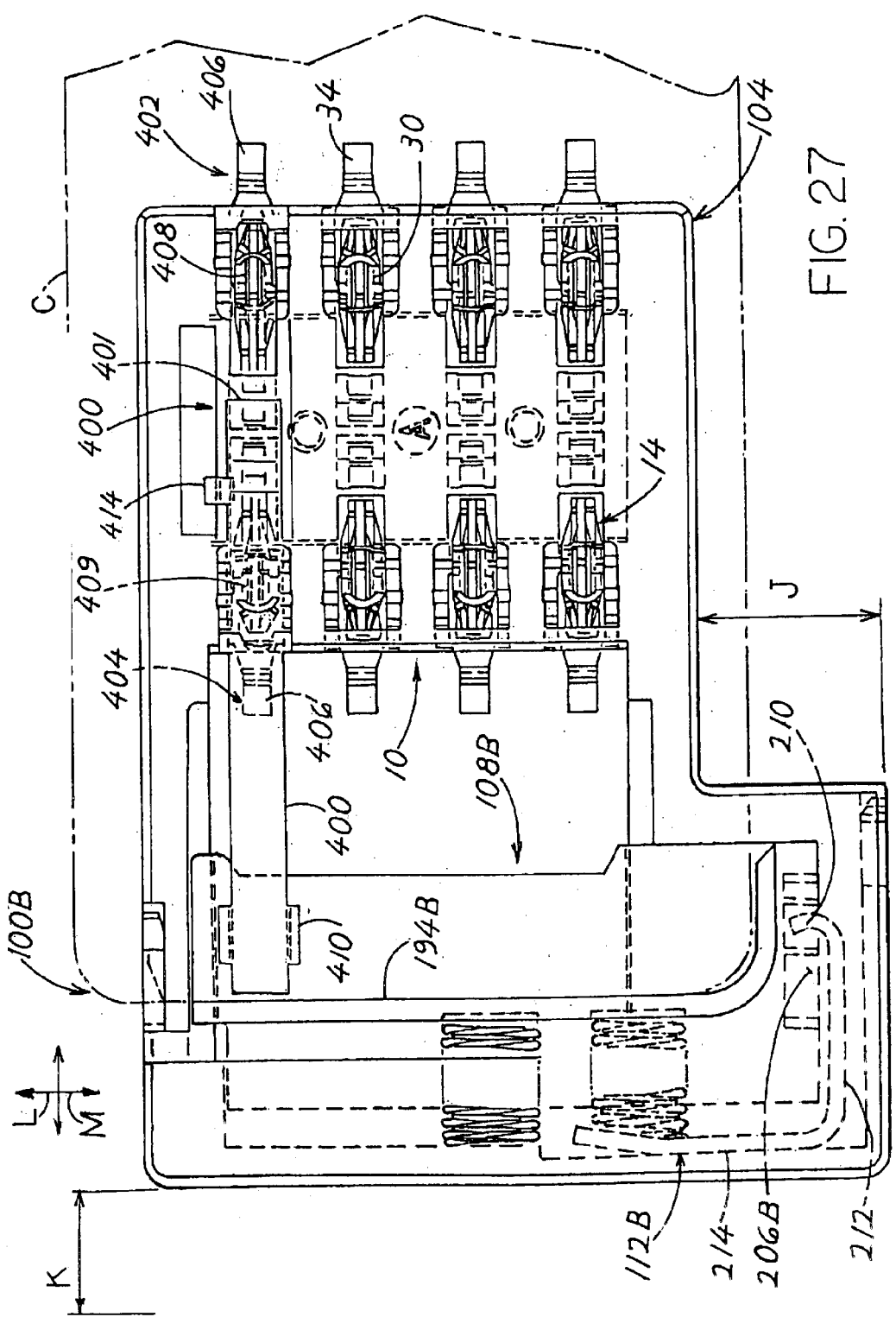
FIG. 27 is a plan view of a small length reader of another embodiment of the invention with the card and carriage in their full forward position.

FIG. 27 shows a reader 100B of small length in a longitudinal direction M. This is accomplished by locating the recess that forms the cam 206B so it lies laterally L beside the path of the card C. The recess extends completely through the element that forms the cam. The cam follower 12B is of the same construction as in FIG. 13, with a short primarily laterally-projecting first part 210, a longitudinally-extending second part 212, and a largely laterally extending mount part 214. It is noted that the second part 212 must have a sufficient length to result in primarily vertical (not horizontal) movement of the first part 210 in the recess that forms the cam.

FIG. 27 shows the card C and the pushing surface 194B on the carriage 108B, both in their full forward positions. In these positions the card and pushing surface are laterally L spaced from at least a portion of the cam 206B and cam follower first part 210. Although the lateral width of the reader is increased by distance J, the longitudinal length is reduced by distance K.

Applicant has calculated that for reliable card reading applications the minimum height of the cam and cam follower is 1.8 mm, the minimum length of the cam engaging end 210 is 1.6 mm, and the lateral length of the cam and cam follower combination is 2.5 mm.

While terms such as "top", "bottom", etc. have been used to describe the invention as it is illustrated, it should be understood that the reader can be used in any orientation with respect to the Earth.

Thus, the invention provides a compact and easily operated smart card reader. The reader includes a frame with rear and front bodies that are separately molded, with the rear body being molded separately or integrally with an insulator that holds contacts. The rear body has a rear part and a pair of legs projecting forwardly from opposite sides of the rear part and locked to opposite sides of the front body. The front body has a center cavity portion that slidably receives the carriage, one or more springs that bias the carriage rearwardly, and a cam follower of a double click mechanism that engages a cam of the mechanism that is formed as a recess in a side of the carriage. The recess is formed in a vertical surface of a part of the carriage. The double click mechanism enables a card to be inserted and retrieved in a very simple and natural manner. The frame has stops on opposite sides of the carriage in its overtravel position, which encourages proper rotational orientation of the card.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A smart card reader for receiving a smart card that has a vertical thickness and horizontally extending width and length said card having opposite faces and contact pads on an active one of said card faces, wherein the reader includes a frame device having a card-adjacent surface lying in a horizontal plane, and a plurality of contacts mounted on said frame device for engaging said contact pads when said card active face lies in a horizontal plane, a carriage device that is slideable in forward and rearward horizontal longitudinal directions on the frame device and that has a card pushing surface for partially ejecting a card, and a spring that urges the carriage device rearward, comprising:

a double click device that includes a largely planar cam-forming wall that has a recess forming a cam part, said double click device having a cam follower part engaged with the cam part, with one of said parts mounted on said frame device and the other mounted on said carriage device;

said largely planar cam-forming wall lies in a substantially vertical plane that is substantially normal to a lateral direction that is horizontal and perpendicular to said longitudinal directions, to thereby minimize the lateral width of the double click device.

2. The smart card reader described in claim 1 wherein:

said cam-forming wall is fixed to said carriage to move with the carriage;

said cam follower part includes a first part that extends laterally into said recess that forms said cam, a second part that extends primarily forwardly from said first part, and a third part that extends laterally and that lies behind said recess and that is pivotally mounted on said housing.

3. The smart card reader described in claim 1 wherein:

said cam-forming wall is fixed to said carriage to move with the carriage;

said cam follower part includes a first part that extends laterally into said recess that forms said cam;

said card pushing surface is moveable between a rearward position, which said pushing surface occupies when no card is present, and a forward position which said pushing surface occupies when a card and said pushing surface lie in full forward positions;

at least a portion of said recess, and said first part of said cam follower, are directly laterally spaced from said card in its said card full forward position, to thereby reduce the longitudinal length of said reader.

4. The smart card reader described in claim 1 wherein:

said cam-forming wall is fixed to said carriage to move with the carriage;

said cam follower part includes a first part that extends laterally into said recess that forms said cam, a second part that extends primarily forwardly from said first part, and a third part that extends laterally and that lies behind said recess and that is pivotally mounted on said housing;

said spring presses against said cam follower third part to provide limited friction against pivoting.

5. A smart card reader for receiving a smart card that has opposite faces and contact pads on one of said faces, wherein the reader includes a frame having a card-adjacent surface, and a plurality of contacts mounted on said frame and having pad-engaging ends extending above said card-adjacent surface, comprising:

a carriage that is slideable in forward and rearward longitudinal directions on the frame, said carriage having a card push surface for partially ejecting a card;

a spring that urges the carriage rearward;

a double click device that latches said carriage in a forward working position after the carriage has, for the first time been moved forward to an overtravel position that is slightly forward of said working position, and that releases the carriage to be moved rearward by said spring to an initial position when the carriage is pushed forward to said overtravel position for the second time;

said carriage push surface lies above said card-engaging surface to enable a card front end to push said carriage forwardly, and said frame has a pair of stops that project above the level of said card-adjacent surface and that lie on either side of and even with said push surface in said overtravel position of said carriage.

6. The reader described in claim 5 wherein:

said double click device includes a cam part in a form of a recess and a cam follower part engaged with the cam part, with one of said parts mounted on frame and the other mounted on said carriage, said cam follower part having a mount that is pivotally mounted about an axis that is perpendicular to said longitudinal directions, and said spring presses against said cam follower mount to provide an appreciable but limited friction against pivoting of the cam follower part.

7. The reader described in claim 5 wherein:

said frame includes a main body with a rear portion that has laterally opposite sides, and a pair of laterally-spaced legs extending forwardly from each of said laterally opposite sides of said rear portion, said legs having front ends, said carriage lying between said legs and said legs forming guide walls that guide said carriage in longitudinal movement;

said frame includes a front body that has laterally opposite side portions that are each connected to a front end of one of said legs, said front body having a central cavity region;

said carriage being received in and being longitudinal slideable in said central cavity region; and including said spring that biases said carriage rearwardly, lies at least partially in said central cavity region.

8. A smart card reader for receiving a smart card that has a card face with contact pads therein and that has front and rear opposite ends, comprising:

a frame that includes an upper card-adjacent face;

a carriage that is slideable in front and rear longitudinal directions on said frame, said carriage having an upstanding push wall for engaging an end of the smart card;

a plurality of contacts mounted on said frame and having pad engaging ends projecting above said card-adjacent face;

said frame includes a main body with a rear portion that has laterally opposite sides, and a pair of laterally-spaced legs extending forwardly from each of said laterally opposite sides of said rear portion, said legs having front ends, said carriage lying between said legs and said legs forming guide walls that guide said carriage in longitudinal movement;

said frame includes a front body that has laterally opposite side portions that are each connected to a front end of one of said legs, said front body having a central cavity region;

said carriage being received in and longitudinally slideable in said central cavity region; and including a spring that biases said carriage rearwardly and that lies at least partially in said central cavity region.

9. The reader described in claim 8 wherein:

said spring is a helical spring;

said carriage has a front portion with passage walls forming a passage with an open front end and with a longitudinally-extending open top gap and a longitudinally-extending open bottom gap, whereby to receive a spring of maximum diameter.

10. The reader described in claim 8 wherein:

said carriage has opposite sides that each has top and bottom flanges extending away from the flanges on the opposite side;

said guiding walls of said legs form rails that each lies vertically between the top and bottom flanges on each side of the carriage.

11. The reader described in claim 8 wherein:

said carriage has an upstanding wall with a rear push surface lying above said upper card-adjacent face to abut the front end of a card;

said frame includes a pair of upstanding stops with rearwardly-facing stop surfaces, said stops each lying on one of said legs, said carriage being forwardly slideable to a carriage overtravel front position wherein said push surface lies between and even with said stop surfaces of said stops.

12. A smart card reader for receiving a smart card that has a face with contact pads thereon and that has front and rear ends, the reader having contacts for engaging the pads, comprising:

a frame that includes a rear body, said rear body having a rear part with laterally opposite sides and a pair of laterally-spaced legs extending forwardly from said opposite sides;

said frame includes a front body with laterally opposite sides fixed to said legs, said front body having a middle cavity portion that opens rearwardly;

a carriage that is slideably guided in front and rear movement between said legs, said carriage having a front portion that slides within said middle cavity portion, and said carriage front portion having a forwardly-opening spring passage;

a largely helical wire spring that has a rear portion lying in said spring passage and a front portion lying in said middle cavity portion.

13. The reader described in claim 12 wherein:

said front body has laterally opposite side cavities, and said legs have front ends lying in said side cavities.

14. The reader described in claim 12 wherein:

a double click mechanism including a cam formed on said carriage and a cam follower having a first part engaged with said cam, a second part extending from said first part, and a third part extending from second part, said third part lying in said middle cavity portion and pivotally mounted therein.

15. The reader described in claim 14 wherein:

said third part lies between a front end of said spring and a wall of said front body, to provide friction against pivoting of said cam follower.

16. The reader described in claim 12 wherein:

said rear body has a pair of wings at laterally opposite sides that each extends rearward from one of said legs;

each wing has a smaller thickness than said legs.

17. The reader described in claim 16 including:

a switch mounted on one of said legs, said switch constructed to sense full insertion of a card, said switch having a pair of electrical terminals lying under a first of said wings, and said first wing has a vertical hole lying directly over said terminals.

18. The reader described in claim 12 including:

a switch for sensing card insertion, including a conductive blade fixed to said carriage and having a rear portion that lies over at least one of said contacts to alternately engage it and break engagement with the contact as said carriage moves.

19. A smart card reader for receiving a smart card that has opposite faces and contact pads on one of said faces, wherein the reader includes a frame device having a card-adjacent surface, and a plurality of contacts mounted on said frame device and having pad-engaging ends extending above said card-adjacent surface, a carriage device that is slideable in forward and rearward longitudinal directions on the frame device and that has a card pushing surface for partially ejecting a card, and a spring that urges the carriage device rearward, comprising:

a double click device that includes a recess forming a cam part, said double click device having a cam follower part engaged with the cam part, with one of said parts mounted on said frame device and the other mounted on said carriage device, said cam follower part having a mount portion pivotally mounted about an axis that is perpendicular to said longitudinal directions, and said spring pressing said mount portion against the device on which said cam follower part is mounted to provide an appreciable but limited friction against pivoting of the mount portion.

20. The reader described in claim 19 wherein:

said cam part is formed by a recess in a first wall of said carriage;

said cam follower part is formed by an elongated member with two substantially 90° bends forming a first part that extends largely laterally and projects into the recess, a second part that forms said mount portion and that extends largely longitudinally and perpendicular to said first part, and a third part that forms said mount portion and that extends largely laterally and that is pivotally mounted on the frame device;

said spring includes a compression spring with one end that presses against said third part of said elongated member and that presses said third part against said frame.

21. The reader described in claim 20 wherein:

said cam follower third part has a slight bend of less than 30° that leaves a far end on one side of said slight bend, and said spring end presses on said far end to urge said elongated member to pivot about a vertical axis at said slight bend to urge said first part into said recess.

22. The reader describe in claim 19 including:

a circuit board with an upper face and conductive traces therein, said frame mounted on said board upper face;

said carriage device has a rear end and said frame forms a carriage-facing end wall with laterally opposite sides and with a middle, said middle of said carriage-facing end wall being spaced from said carriage rear end, to leave a space between the middle of the carriage-facing end wall and the carriage rear end that is open vertically when said carriage lies in a rearward position, and said contacts have tails soldered to said circuit board traces at the bottom of said space.

* * * * *